United States Patent
Bovee

(10) Patent No.: US 9,338,330 B2
(45) Date of Patent: May 10, 2016

(54) METHOD AND APPARATUS FOR CONTINUOUS MOTION FILM SCANNING

(75) Inventor: Reed Bovee, Anchorage, AK (US)

(73) Assignee: Reflex Technologies, LLC, Burbank, CA (US)

( * ) Notice: Subject to any disclaimer, the term of this patent is extended or adjusted under 35 U.S.C. 154(b) by 1242 days.

(21) Appl. No.: 13/200,464

(22) Filed: Sep. 23, 2011

(65) Prior Publication Data

US 2013/0076890 A1 Mar. 28, 2013

(51) Int. Cl.
*H04N 3/36* (2006.01)
*H04N 3/38* (2006.01)

(52) U.S. Cl.
CPC ...................................... *H04N 3/38* (2013.01)

(58) Field of Classification Search
CPC ........... H04N 5/253; H04N 9/11; H04N 3/38; H04N 3/36; H04N 7/0112; H04N 3/04; H04N 1/195
See application file for complete search history.

(56) References Cited

U.S. PATENT DOCUMENTS

| | | | |
|---|---|---|---|
| 3,393,847 A | 7/1968 | Young et al. | |
| 3,410,498 A | 11/1968 | Winkler et al. | |
| 3,803,353 A | 4/1974 | Sanderson et al. | |
| 3,937,421 A | 2/1976 | Fender et al. | |
| 4,007,889 A | 2/1977 | Langford | |
| 4,054,912 A | 10/1977 | Millward et al. | |
| 4,131,344 A | 12/1978 | Hardy | |
| 4,154,528 A | 5/1979 | Watson et al. | |
| 4,206,981 A | 6/1980 | Ozaki et al. | |
| 4,213,193 A | 7/1980 | Reid et al. | |
| 4,271,415 A | 6/1981 | Murakoshi et al. | |
| 4,356,945 A | 11/1982 | Carter | |
| 4,359,179 A | 11/1982 | Waiss | |
| 4,390,145 A | 6/1983 | Giese | |
| 4,466,087 A | 8/1984 | Cheng | |
| 4,498,761 A | 2/1985 | Therien et al. | |
| 4,522,351 A | 6/1985 | Yessian et al. | |
| 4,587,572 A | 5/1986 | DiGiulio | |
| 4,594,614 A | 6/1986 | Frank et al. | |
| 4,688,099 A | 8/1987 | Funston | |
| 4,698,683 A | 10/1987 | Schwartz et al. | |

(Continued)

FOREIGN PATENT DOCUMENTS

| DE | 19731530 | 1/1999 |
|---|---|---|
| EP | 0798591 | 10/1997 |

(Continued)

OTHER PUBLICATIONS

Patent Cooperation Treaty; Notification of Transmittal of the International Search Report and Written Opinion of the International Searching Authority, or the Declaration; Dec. 6, 2012.

(Continued)

*Primary Examiner* — Cheukfan Lee
(74) *Attorney, Agent, or Firm* — Olson & Cepuritis, Ltd.

(57) ABSTRACT

A continuous film scanning system for high resolution digital archival and duplication of motion picture film on a frame by frame basis. Film is driven through the film scanning system through the use of rollers and maintained at a consistent tension throughout the scanning process. Optical interrogation of the perforations associated with each film frame is used to trigger digital image capture. The continuous film scanning system is particularly well adapted to safely handle imperfect or damaged film stock.

22 Claims, 14 Drawing Sheets

(56) References Cited

U.S. PATENT DOCUMENTS

| | | | |
|---|---|---|---|
| 4,854,691 A | 8/1989 | Sekine et al. | |
| 4,855,836 A | 8/1989 | Shearer | |
| 4,858,003 A | 8/1989 | Wirt et al. | |
| 4,875,102 A | 10/1989 | Poetsch | |
| 4,901,161 A | 2/1990 | Giovanella | |
| 4,903,131 A | 2/1990 | Lingemann et al. | |
| 4,929,976 A | 5/1990 | Cunningham et al. | |
| 4,973,151 A | 11/1990 | Bryant | |
| 5,012,346 A | 4/1991 | DeJager et al. | |
| 5,101,286 A | 3/1992 | Patton | |
| 5,107,127 A * | 4/1992 | Stevens | 250/548 |
| 5,199,168 A | 4/1993 | Daly | |
| 5,220,617 A | 6/1993 | Bird et al. | |
| 5,221,848 A | 6/1993 | Milch | |
| 5,249,056 A | 9/1993 | Foung et al. | |
| 5,266,979 A | 11/1993 | Brown et al. | |
| 5,328,073 A | 7/1994 | Blanding et al. | |
| 5,400,117 A | 3/1995 | Fetterman et al. | |
| 5,402,166 A | 3/1995 | Mead et al. | |
| 5,418,597 A | 5/1995 | Lahcanski et al. | |
| 5,430,477 A | 7/1995 | Bachmann et al. | |
| 5,447,170 A | 9/1995 | Stein et al. | |
| 5,461,492 A | 10/1995 | Jones | |
| 5,528,288 A | 6/1996 | Sandor et al. | |
| 5,529,232 A | 6/1996 | Blanding | |
| 5,546,143 A | 8/1996 | Nakatsuyama et al. | |
| 5,565,912 A | 10/1996 | Easterly et al. | |
| 5,600,450 A | 2/1997 | Kaye et al. | |
| 5,671,008 A | 9/1997 | Linn | |
| 5,673,098 A | 9/1997 | Sakashita et al. | |
| 5,707,743 A | 1/1998 | Janes et al. | |
| 5,771,109 A | 6/1998 | DiFrancesco | |
| 5,815,202 A | 9/1998 | Difrancesco | |
| 5,886,772 A | 3/1999 | Inatome et al. | |
| 5,940,650 A | 8/1999 | Inana et al. | |
| 6,037,973 A | 3/2000 | DiGiulio et al. | |
| 6,068,206 A | 5/2000 | Lindsay, Jr. | |
| 6,078,354 A * | 6/2000 | Eiberger | H04N 3/38 226/87 |
| 6,081,293 A | 6/2000 | Brown et al. | |
| 6,124,885 A | 9/2000 | Mooney et al. | |
| 6,137,530 A | 10/2000 | Brown | |
| 6,147,779 A | 11/2000 | Bolton et al. | |
| 6,169,571 B1 | 1/2001 | Rivers et al. | |
| 6,172,705 B1 | 1/2001 | DiFrancesco et al. | |
| 6,220,542 B1 | 4/2001 | Titor | |
| 6,292,253 B1 | 9/2001 | Reed et al. | |
| 6,318,861 B1 | 11/2001 | Nagumo | |
| 6,336,608 B1 | 1/2002 | Cope | |
| 6,434,978 B1 | 8/2002 | Mance | |
| 6,508,750 B1 | 1/2003 | Poorman | |
| 6,520,643 B1 | 2/2003 | Holman et al. | |
| 6,678,913 B1 | 1/2004 | Wayne | |
| 6,712,270 B2 | 3/2004 | Leach | |
| 6,891,562 B2 | 5/2005 | Spence et al. | |
| 6,992,718 B1 | 1/2006 | Takahara | |
| 6,994,293 B1 | 2/2006 | Coburn | |
| 7,093,939 B2 | 8/2006 | Breish et al. | |
| 7,110,020 B2 | 9/2006 | Glenn | |
| 7,219,851 B2 | 5/2007 | Davis | |
| 7,360,703 B2 | 4/2008 | McIntyre et al. | |
| 7,400,378 B2 | 7/2008 | Michelson et al. | |
| 7,419,077 B2 | 9/2008 | Field | |
| 7,777,832 B2 | 8/2010 | Richard et al. | |
| 2003/0184811 A1 | 10/2003 | Overton | |
| 2005/0219462 A1 | 10/2005 | Breish et al. | |
| 2006/0023275 A1 | 2/2006 | Feiner et al. | |
| 2008/0067395 A1 * | 3/2008 | Loew | 250/393 |
| 2009/0231547 A1 | 9/2009 | Olson | |
| 2010/0133424 A1 | 6/2010 | Lindsay | |
| 2011/0000948 A1 | 1/2011 | Fuwa | |

FOREIGN PATENT DOCUMENTS

| | | |
|---|---|---|
| EP | 1 857 812 A1 | 11/2007 |
| GB | 2354088 | 3/2001 |
| JP | 567265 | 1/1981 |
| JP | 59164932 | 9/1984 |
| JP | 60253380 | 12/1985 |
| JP | 8340481 | 12/1996 |
| JP | 9222670 | 8/1997 |
| JP | 2002205877 | 7/2002 |
| JP | 2004333613 | 11/2004 |
| WO | 9638760 | 12/1993 |
| WO | 9625007 | 8/1996 |
| WO | WO 97/37489 | 10/1997 |
| WO | WO 97/39571 | 10/1997 |
| WO | 02093251 | 11/2002 |
| WO | WO 2009/027207 | 3/2009 |
| WO | 2010045062 | 4/2010 |

OTHER PUBLICATIONS

Matthew D. Baumgart, Robust Control of Nonlinear Tape Transport Systems With and Without Tension Sensors, Jan. 2007, vol. 129.
World Beam® QS18LLP Series, Miniature Polarized Retroreflective Laser Sensors, Mar. 2009.
Whitis, Line Scan Camera emulation mode, http://chdk.setepontos.com/index.php?topic=4073.0;wap2 (1 of 7), Aug. 17, 2009.
White et al., Winding Control Using Pseudo-Derivative Feedback, Sage Publications, vol. 220, No. 4, 2006, (Abstract) http://journals.pepublishing.com/content/j244700813822657/.
Predictive Models of Web-to-Roller Traction, Journal of Tribology, Jan. 2005, (Abstract).
Magnetic Sound Recording, Deutsche Welles, Sep. 2, 2001.
Gerhardt K, "Vergangenheit und Zukunft des Films", Fkt Gernseh und Kinotechnik Jul. 1, 2010, pp. 320-324, vol. 64, Fachverlag Schiele & Schon Gmbh. Berlin, DE.
European Search Report, Jun. 24, 2015.

* cited by examiner

Servo Control

| Min F/S Set Point | Capstan Speed Command | Motor Speed |
|---|---|---|
| 0.0 F/S | 0 RPM | 0 RPM |
| Max F/S Set Point | Capstan Accellerate Rate | Motor Avg Load |
| 0.0 F/S | 0 x .001s | 0% |
| Current F/S Set Point | Capstan Decellerate Rate | Motor Peak Load |
| 0.0 F/S | 0 x .001s | 0% |
| F/S Calibration # | Jitter Suppression 0-19 | Drive Bus volts |
| 0.00000 | 0 | 0 Volts |
| E-Prom Write | | Servo Disabled Push To Enable |
| 0 | HOME | |

Run Mode Reel Parameters

| Take Up Reel | Auto Tension | Supply Reel |
|---|---|---|
| Minimum speed | OFF / ON | Minimum Speed |
| 0.0 RPM | | 0.0 RPM |
| Maximum speed | Maximum Frames/Second | Maximum Speed |
| 0.0 RPM | 0.0 F/S | 0.0 RPM |
| Run forward Tension | Minimum Frames Second | Run Forward Tension |
| 0.0% | 0.0 F/S | 0.0% |
| Run Reverse Tension | | Run Reverse Tension |
| 0.0% | HOME | 0.0% |

METHOD AND APPARATUS FOR CONTINUOUS MOTION FILM SCANNING

FIELD OF THE INVENTION

The present invention relates to motion picture film scanning systems, and more particularly to high speed digital imaging of sequential frames from motion picture film strips. In particular, the invention relates to a method and apparatus for accomplishing high resolution transfer of individual frames of motion picture film stock to a digital format with precision frame accuracy for film preservation, restoration, and archival.

BACKGROUND OF THE INVENTION

Motion picture film stock is composed of a photographic emulsion coated on a transparent plastic base. The plastic base and photographic emulsion are chemically unstable and are subject to decomposition and degradation over time. This is particularly true with respect to older film stock using cellulose nitrate, cellulose diacetate, or cellulose triacetate, which are known to be unstable mediums and suffer from known disadvantages including a low flash point, depolymerization of the film stock, vinegar syndrome, shrinkage, structural weakening, and brittleness. The photographic emulsion is also susceptible to damage from moisture or pressure, resulting in a distortion in the geometry of the film frame and stock. All of these conditions effectively degrade the condition of the original film strip, in some cases to the point where the film strip becomes unplayable.

While the original film can be repaired and cleaned, the degradation process cannot be stopped. Digital imagery is not subject to these degradation problems. It is therefore desirable to be able to accurately duplicate the film at a resolution equivalent to or greater than the original for archival purposes.

Standard specifications exist for 8 mm, 16 mm, 35 mm, and 70 mm wide film. These standards specify the height and width of the sprocket holes, the radius of the curves at the corners, the distances to the edge of the film, and the alignment tolerances between two sprocket holes and the edges. Prior to the adoption of standard specifications, sprocket holes varied widely in size and shape. It is desirable for a single machine to be able to handle a variety of film formats.

Older film stock presents a number of potential problems that need to be addressed for restoration. One such problem is film shrinkage, which is often irregular due to different levels of decay throughout the length of the film. Perforations or sprocket holes in films are also susceptible to damage from stress. Burrs or minor damage to film perforations can cause the film to be transported unsteadily and the resultant film image to appear to jump on screen. Film stock that has been spliced and repaired may also be damaged at the spliced location over time, resulting in complications due to uneven thickness or decaying adhesive.

Continuous motion telecine systems transport film by engaging sprocket teeth into the perforated holes that occur at even intervals along the edge of the film stock. Such equipment cannot readily handle transportation of film which may be shrunken, warped, or damaged. Such systems are generally incapable of handling film that has shrunken by more than a few percent, since the shrinkage causes the distance between perforations to become diminished and too closely spaced to engage a standard sprocket without the sprocket teeth potentially causing further damage to the perforations. Particularly with older film stock, the sprocket teeth in the telecine system may further damage the perforations along the edge of the film.

Digital scanning of each individual frame image requires a significant expenditure of time and expense. Instead of scanning frame by frame, some continuous motion telecine systems instead scan the film by storing an electronic video signal in a digital video format through a projector optically mated to a video camera. A disadvantage of these continuous motion telecine systems is that it is not possible to produce a picture from a still frame without having first moved the picture past the digital imaging device. Such systems are also incapable of producing individual digital image files representing an entire image area of each film being scanned at a high resolution. Still other systems are trigger image capture based on tachometric timing of the film being transported. Tachometer based systems are imprecise and result in variances in the vertical registration of successive image captures. Still other systems start and stop the transportation of the film on a frame by frame basis in order to capture each frame individually and to minimize issues arising from blurring or blending problems arising from the continuous motion of the film stock. The intermittent stop-start motion of the film stock in such systems results in additional stress to already endangered film stock and adds to time required to digitally archive a motion picture film.

A need therefore exists for a system that can create high resolution digital images of each individual frame of the film in an economic fashion. Such a machine should maintain a temporal correspondence between the generated video signal and the original motion picture film stock. Furthermore, the machine should be able to accept and safely handle film that may be shrunken, warped, brittle, or suffering other damage to the film stock or film perforations.

SUMMARY OF THE INVENTION

The present invention relates to a film scanning system for digitally archiving motion picture film. The film scanning system facilitates high resolution digital duplication of a motion picture film on a frame by frame basis while preserving the maximum amount of visual information on the film frame. The film scanning system includes hardware components including a film transport assembly, one or more capstan drive assemblies, a film gate assembly, and an image capture assembly.

The film transport assembly facilitates the safe handling of motion picture film under a variety of operational conditions. The film transport assembly includes tension sensor roller assemblies which are used to maintain the film tension at a consistent level during transportation of the film through the film scanning system. The tension sensor roller assemblies measures the tension of the film both before and after the film gate. As film is deployed or taken on to reels, the diameter and mass of the film reel changes, resulting in changes in the film tension throughout the scanning cycle. As changes in the film tension are sensed, the amount of mechanical torque applied to the corresponding reel of film is adjusted to maintain a consistent amount of linear force on the film during transportation without regard to the reel diameter. As a result, film between the tension sensor roller assemblies is kept in a state of equilibrium and stresses to the film strip are minimized.

The film scanning system may have one or more capstan drive assemblies. The capstan drive assemblies comprise a capstan roller and a pinch roller that engage the film between them to drive the film through the film scanning system. The capstan drive assemblies include rollers with a group of O-rings along their circumference. The O-rings are preferably composed of a material that is non-abrasive to film stock. By using O-rings, the total contact area between the rollers and the film surface is reduced and physical stress to the film is also reduced. The O-rings also exhibit a self cleaning property in that contaminants accumulating on the surface of the O-rings are transported into the grooves between the O-rings and away from the film surface during operation. Since the capstan drive assembly drives film through the use of rollers rather than a sprocket based drive mechanism, film with damaged perforations can be safely driven at a consistent rate.

The image capture assembly is used to capture each individual frame of the motion picture film strip as a digital file using a triggerable capture system when the frame is properly aligned. The image capture assembly includes a laser based optical registration system, a synchronized strobe light, and an externally triggerable CCD digital camera. In order to determine the location of a film frame and determine when the film frame is properly aligned for image capture, a laser beam from a positioning sensor is used to detect the presence of the trailing edge of the film perforation. In order to improve accuracy, the laser beam is passed through an anamorphic lens to reshape the laser beam from a round beam to a line beam. The line beam improves the accuracy of vertical registration of the film frame, since it is widens the area being sensed and is less susceptible to imperfections in the perforation edge. When a trailing edge of the film perforation, which is less susceptible to damage than the leading edge, is detected, the film frame is properly aligned in the film gate for image capture. A strobe light is triggered, with illumination from the light traveling through the film frame image to be digitally captured on the CCD digital camera. Through use of a strobe light, the film frame is optically frozen and captured as a still image despite the film frame being in constant motion.

The film gate assembly is used to accurately position the motion picture film during scanning, particularly in the lateral direction. The film gate assembly includes a film gate guide through which the film is threaded. The film gate guide includes a film aperture through which the film image to be scanned can be isolated. Film transported through the film gate guide is held in place along the edges of the film. The center portion of the film gate guide in the direction of film travel is relieved, so as to minimize physical contact with the image portion of the motion picture film strip. The film gate assembly also includes spring loaded linear guide bearings that apply lateral pressure to the film edge against a fixed edge guide. The film gate assembly promotes consistent alignment and registration of successive film frames in the lateral direction, even if the film edges are warped.

The present invention provides numerous advantages facilitating the safe digital archival of imperfect or damaged motion picture film stock. The film scanning system of the present invention addresses issues arising from shrunken film, film transport of damaged film suffering from damaged perforations or brittleness, and improves accuracy of vertical and lateral registration of the frame being captured to reduce gate weave and jitter.

These and other embodiments of the present invention will become readily apparent to those skilled in the art from the following detailed description of the preferred embodiments having reference to the attached figures, the invention not being limited to any particular preferred embodiments disclosed.

BRIEF DESCRIPTION OF THE DRAWINGS

In the drawings,

FIG. 21 is a sample screen output of the servo control submenu displayed by the user interface on the film scanning system in accordance with an embodiment of the present invention;

FIG. 22 is a sample screen output of the run mode reel parameters submenu displayed by the user interface on the film scanning system in accordance with an embodiment of the present invention;

DETAILED DESCRIPTION OF THE INVENTION

The invention disclosed herein is susceptible to embodiment in many forms. The drawings and description below in detail are directed to preferred embodiments of the invention. It is to be understood that the present disclosure is an exemplification of the principles of the invention and does not limit the invention to the illustrated embodiments.

Figure 1A:
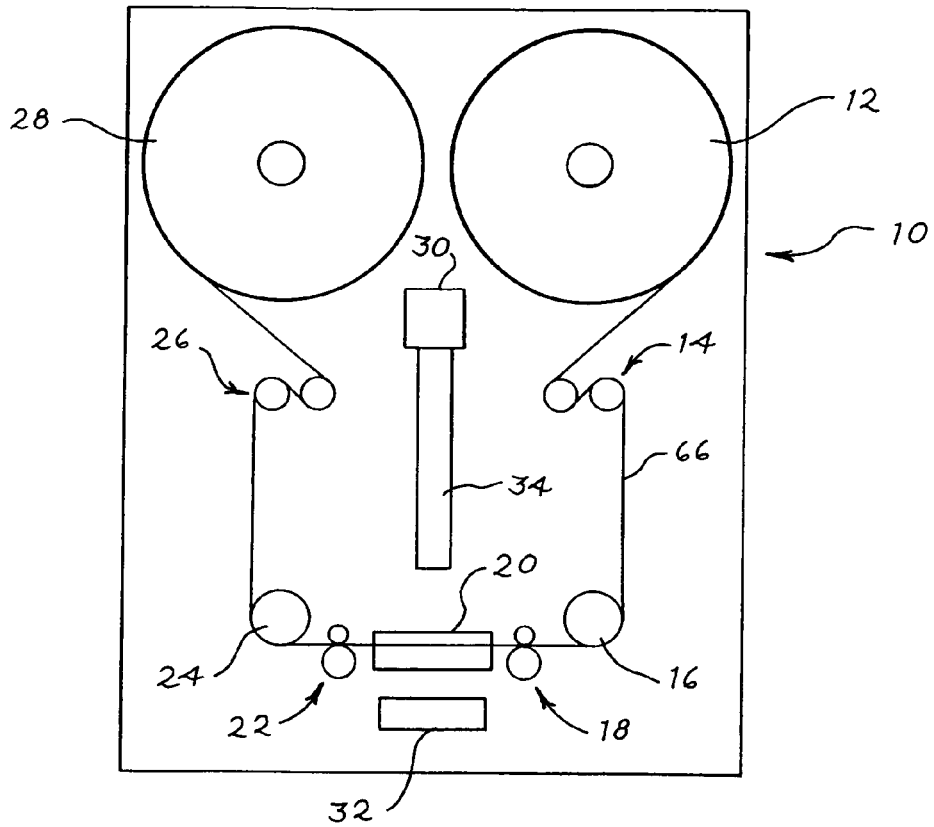
FIG. 1A shows a block schematic diagram of the film scanning system in accordance with an embodiment of the present invention.

Referring to FIG. 1A, an overall view of the film scanning system 10 constructed in accordance with a preferred embodiment of the present invention is shown. Film media is loaded into supply reel 12. From the supply reel 12, film is threaded through the supply tension sensor roller assembly 14, around the return roller 16, through a capstan film drive assembly 18, and through a film gate assembly 20 for scanning. From the film gate assembly 20, the film continues through a capstan film drive assembly 18, through the return roller 24, through the take-up tension sensor roller assembly 26, and finally onto the take-up reel 28. Film frame images at film gate assembly 20 are digitally scanned and captured by a camera 30 through the use of light directed from light source 32 and focused through lens 34.

The gate mechanism 20 is removable and directly interchangeable with alternate gates to enable the device to scan films of different formats. The supply tension sensor roller assembly 14, the capstan film drive assembly 18, and the take-up tension sensor 26, can be adjusted to accommodate the driving of film of different formats and frame rates. In one embodiment, the film transport mechanism is arranged to handle 8 mm, Super 8 mm, and 16 mm film formats at a number of different frame rates. The supply reel 12 and take-up reel 28 may be driven by servo motor drives.

Figure 1B:
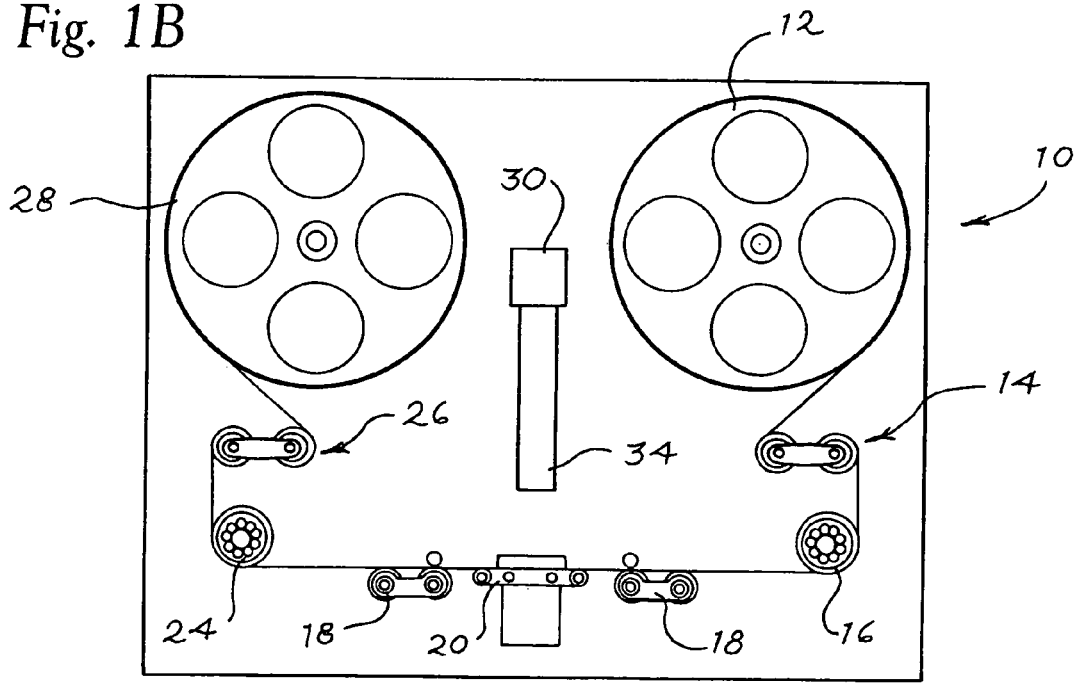
FIG. 1B shows a block schematic diagram of the film scanning system in accordance with another embodiment of the present invention.

FIG. 1B shows an alternative embodiment of the film scanning system 10. As with the previous embodiment, film media travels from a supply reel 12 to a take-up reel 28 through tension sensor roller assemblies 14, 26, return rollers 16, 24, and a film gate assembly 20. In this embodiment, the capstan film drive assembly 18 includes a capstan, pinch roller, and a guide roller as will be described herein.

Figure 2A:
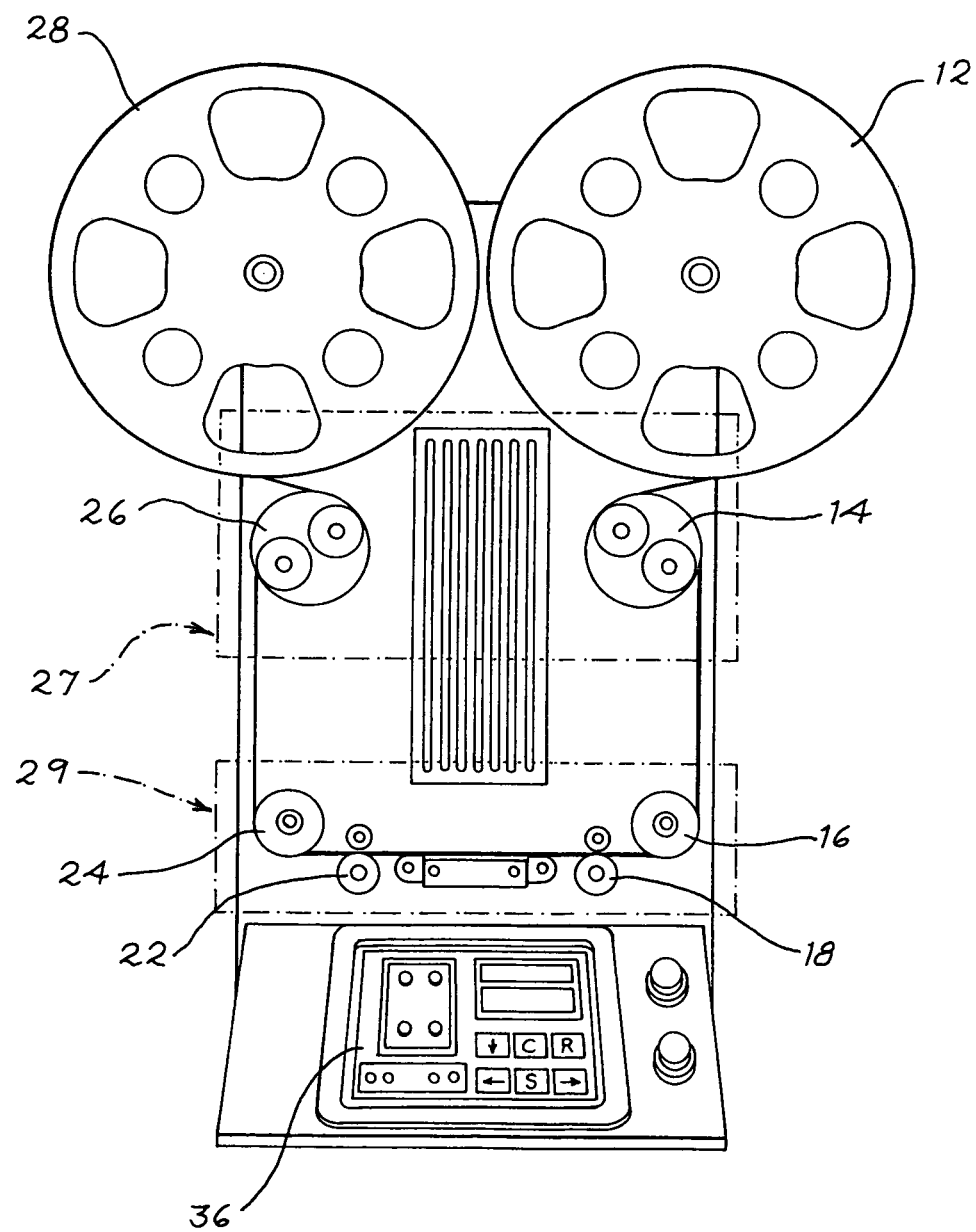
FIG. 2A is a front view of the hardware components of a film transport assembly in accordance with an embodiment of the present invention.

Referring to FIG. 2A, the film transport assembly will be described in additional detail. The supply reel 12, supply tension sensor roller assembly 14, take-up tension sensor roller assembly 26, and take-up reel 28 comprise the upper film transport portion 27 of the film scanning system 10. The film transport assembly also includes a user interface 36, the operation of which will be described herein. The upper film transport portion 27 is designed to securely hold film reels and compensate for the continually changing diameter and mass of the two reels 12 and 28 during operation. As film is fed from supply reel 12 to take-up reel 28, the mass and diameter of the film on the film reels change. If a constant amount of torque were applied to the reels 12 and 28, the film would be would too tightly when the reel is empty and progressively looser as the diameter of the film gradually increases.

To compensate for the ever changing film reel diameters, a film tensioning system including supply tension sensor roller assembly 14 and take-up tension sensor roller assembly 26 have been developed so that the a consistent amount of force is applied to the film throughout the scanning process without regard to the diameter of the film on the reels 12 and 28. In one embodiment, the amount of mechanical torque applied to the supply reel 12 and take-up reel 28 is determined by the rotational position of the supply tension sensor roller assembly 14 and the take-up tension sensor roller assembly 26 respectively.

The tension sensor roller assembly comprises a pair of rollers mounted on a disk containing a spring wrapped around a guide pulley. A rotation sensor is attached to the back of the disk. The rotation sensor measures the rotational deflection of the tension roller and generates an electrical output signal corresponding to the angle of deflection of the tension roller. The signal from the rotation sensor is used to determine the amount of torque to be applied by the servo motor drive on supply reel 12.

Figure 2B:
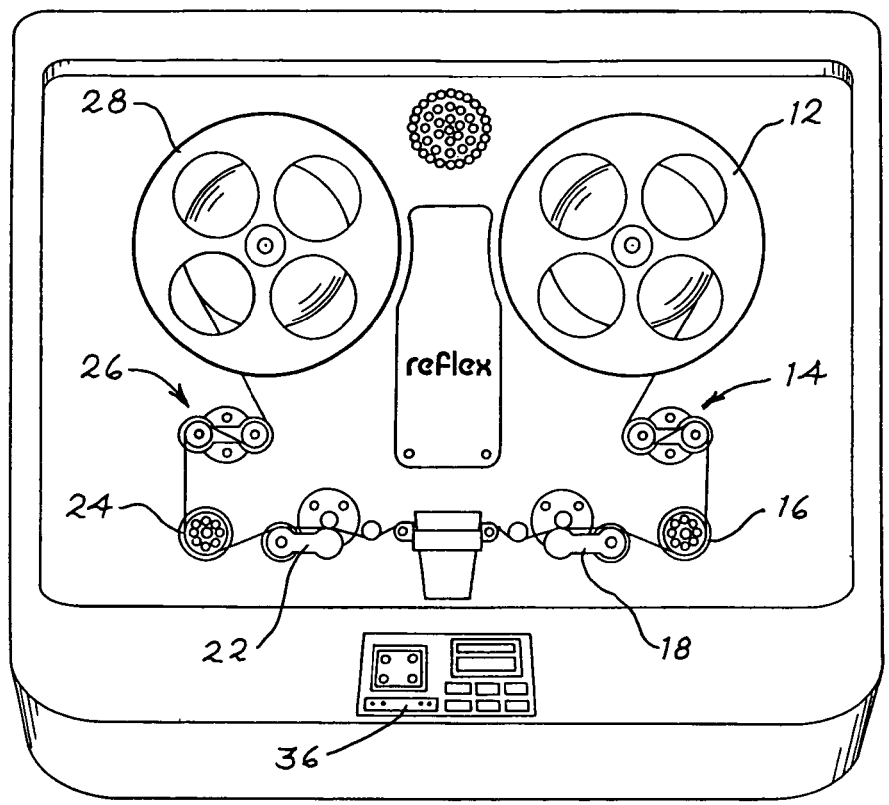
FIG. 2B is a front view of the hardware components of a film transport assembly in accordance with another embodiment of the present invention.

FIG. 2B shows an alternative embodiment of the film scanning system. In this embodiment, the capstan film drive assembly 18 is different from the capstan drive assembly used in the embodiment FIG. 2A in that the capstan film drive assemblies further comprise a guide roller. Although the spatial geometry and configuration are different from that shown in FIG. 2A, the operation remains the same.

Figure 3:
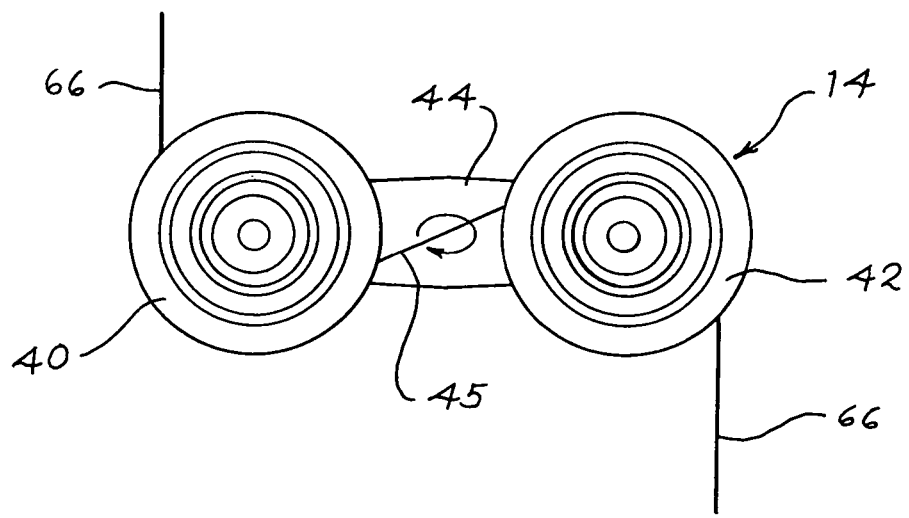
FIG. 3 is a front view of a tension sensor roller assembly in accordance with an embodiment of the present invention.
Figure 4:
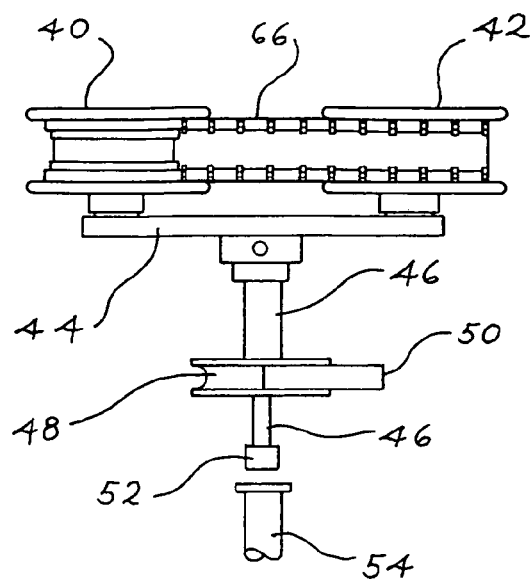
FIG. 4 is a top view of a tension sensor roller assembly in accordance with an embodiment of the present invention.

FIGS. 3 and 4 show the tension sensor roller assemblies that measure and control the lengthwise tension applied to the film as configured according to one embodiment of the present invention. The supply tension sensor roller assembly 14 and the take-up tension sensor roller assembly 26 may be configured in a similar fashion. The tension sensor roller assembly comprises a pair of guide rollers 40, 42. Film 66 passes under the first guide roller 40 and over the second guide roller 42. The guide rollers 40 and 42 are affixed to a rocker arm 44 that rotates about a central axis at the midpoint 45 of the rocker arm 44. In one embodiment, the total range of rotational motion of the rocker arm 44 about the central axis is constrained to 60 degrees.

The rocker arm 44 is fixably connected to a control shaft 46. The control shaft 46 is connected to pulley 48. In one embodiment, the control shaft 46 and pulley 48 may be made of one piece. A spring 50 is wrapped around pulley 48. The spring provides a linear counteracting spring force that is in opposition to the direction of rotation of the rocker arm 44.

A magnetic field generator 52 is connected to the control shaft 46 and a magnetic field sensor 54 is positioned in proximity to the magnetic field generator 52. Through changes in the magnetic field produced by generator 52, the magnetic field sensor 54 measures the rotational position of the rocker arm 44 and creates an electrical output signal corresponding to the degree of rotation of the rocker arm 44. The output signal is used to determine the amount of torque applied to the film by the motors controlling the film supply reel 12 and the take-up reel 28.

As film is transported, the film surface frictionally contacts the tension rollers and produces a drag pulling force tangential to the surface of the tension roller. If the speed at which the film is being pulled through the tension rollers increases, the tension roller will react by rotating away from the neutral position. This rotational deflection in turn generate an electrical signal corresponding to the degree of deflection, which in turn will result in a decrease in the amount of torque applied to the film by the motor driving the supply reel 12. As the torque on the supply reel 12 decreases, slack is introduced to the film, causing the tension rollers to again return to the neutral position. In this manner, the balance between torque and spring tension on the film is maintained regardless of the amount and diameter of the film remaining on the reel.

In this manner, a smooth and linear counteracting force to the movement of the film can be generated. The take-up tension sensor roller assembly 26 is configured similarly and operates in a similar fashion to the supply tension sensor roller assembly 14 for controlling the torque applied to the motor driving take-up reel 28. The supply tension sensor roller assembly 14 and the take-up tension sensor roller assembly 26 operate independently of each other. As a result, the tension of the film segment between the supply tension sensor roller assembly 14 and the take-up tension sensor roller assembly 26 are kept in a state of equilibrium. In a preferred embodiment, less than one inch ounce of torque is sufficient to transport the film through the film scanning system without applying excessive tension and stress to the film stock. In some cases, the film stock being transported may be so brittle that the tension rollers potentially may cause film breakage. To accommodate this situation, the rotational sensor on the tension rollers may disengaged and the torque control on the film reels bypassed.

Referring again to FIG. 2, the lower film transport portion 29 of the film scanning system 10 comprises the return rollers 16, 24, the capstan film drive assemblies 18, 22, and the film gate assembly 20. The lower film transport portion 29 is isolated from the influence of the film tensioning applied by the upper film transport portion 27 described above. This isolation is maintained by the capstan film drive assemblies 18, 22, which are driven by independent servo motors. In operation, the supply-side capstan film drive assembly 18 drives the film, while the take-up side capstan film drive assembly 22 maintains a braking torque. By balancing the torque on the supply and take-up side capstan film drive assemblies 18, 22, the speed of the film segment through the film gate assembly 20 can be gently and precisely controlled.

Figure 5A:
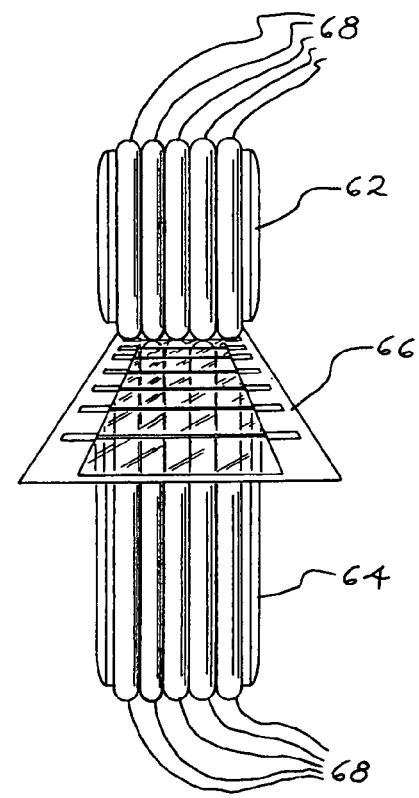
FIG. 5A is a side view of a capstan film drive assembly in accordance with an embodiment of the present invention.

FIG. 5A shows one embodiment of the capstan film drive assembly 60. The capstan film drive assembly 60 comprises a capstan roller 62 and a pinch roller 64, with film 66 being held securely between the capstan roller 62 and pinch roller 64. The capstan roller 62 may be driven by a servo motor. The pinch roller 64 is a free spinning wheel that is not driven. It should be understood by one of skill in the art that the pinch roller 64 may be replaced by a second capstan roller 62. It will also be appreciated by persons of skill in the art that the film scanning system may have one or more capstan film drive assemblies for film transportation and that the capstan film drive assemblies may be located upstream or downstream of the film gate.

Figure 5B:
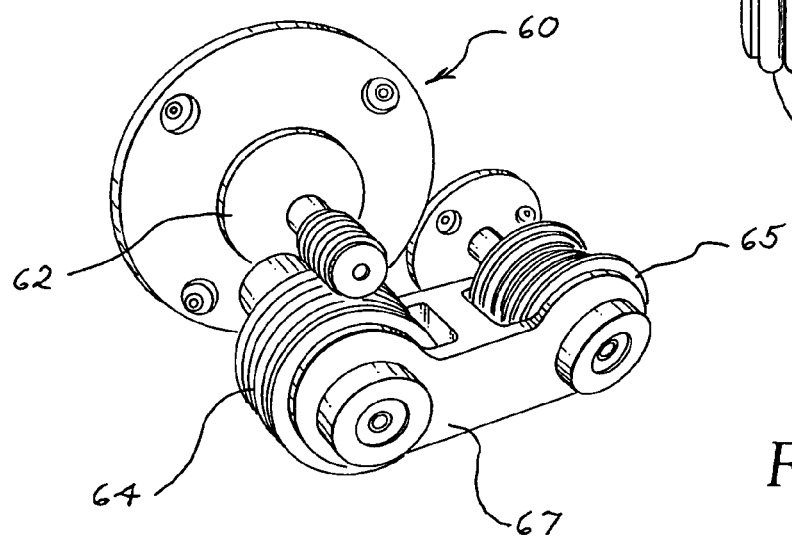
FIG. 5B is a perspective view of the capstan film drive assembly in accordance with an alternate embodiment of the present invention.

FIG. 5B shows an alternate embodiment of the capstan film drive assembly 60. In this embodiment, film is held between capstan roller 62 and pinch roller 64. The capstan film drive assembly 60 further comprises a second guide roller 65 mounted to a pivotable arm 67 along with the pinch roller 64. Film is transported capstan roller 62 and onto guide roller 65, with the pivotable arm 67 being loaded with a spring force to bring the pinch roller 64 in contact with the film.

In one embodiment, the guide roller 65 includes recess around the circumference, such that the outer edges of the guide roller 65 are larger in diameter than the center of the guide roller 65. The recess provides a channel that serves as a guide for film moving through guide roller 65. Since the film is transported through guide roller 65 between the outer raised edges of the guide roller, the film is prevented from movement in the lateral direction. By contacting only the edges of the film, surface contact and potential damage to the film strip is minimized.

In one embodiment, the rollers are machined from stainless steel, with a plurality of circumferential grooves machined into their outer surface to accommodate a plurality of O-rings 68 around the circumference of the rollers. The O-rings may be manufactured from a non-abrasive material and provide stable and secure contact with the film. In one embodiment, the O-rings are manufactured from a non-abrasive polyurethane material. Due to the circular cross section of the O-rings 68, only a small portion of the O-rings actually contact the film strip, thus reducing the total contact area between the film and the rollers. This significantly reduces the physical stress applied to the film and minimizes the potential for damage to sensitive film strips. Use of a plurality of O-rings 68 in this configuration provides an additional benefit in that dust or other contaminants that may be present on the surface of the film 66 tends to accumulate on the surface of the O-ring 68 and is pushed down into the grooves formed between a pair of O-rings 68.

Film is driven through the film scanning system 10 by the capstan and pinch roller arrangement. By using a capstan system to drive the film, no sprockets, pins, protrusions, guides, or claws come into contact with the perforations on the film stock. This eliminates the risk of causing damage to film perforations during scanning. Damaged films which cannot be viewed or projected by sprocket driven machines because of damaged perforations also can be readily handled using the capstan system.

Older films may suffer from shrinkage, a condition that causes the film's dimensions to be slightly reduced in the longitudinal and lateral directions. As a consequence of this overall size reduction, the distance between each perforation of the film is also diminished. Film shrunken more than approximately 1.5% will not properly engage a standard sized sprocket without the sprocket teeth causing damage to the perforation. This can lead to further damage of the film and a condition referred to as ticking, whereby the sprocket teeth produce an audible "tick" as they nick the edge of each passing perforation. Since film in the present invention is transported by a capstan film drive assembly rather than a sprocket based system, severely shrunken film can be transported without the risk of causing damage to the film perforations.

Film gate assembly 20 is used to hold the film in place as it travels from the supply reel 12 to the take-up reel 28. The film gate assembly 20 holds the film steady and keeps the film aligned so that images from the individual frames can be captured by the image capture assembly 100. The image capture assembly 100 captures each individual frame of film as a digital file by using a laser based optical registration system, a synchronized strobe light, and an externally triggered charge-coupled device (CCD) digital camera.

Figure 6:
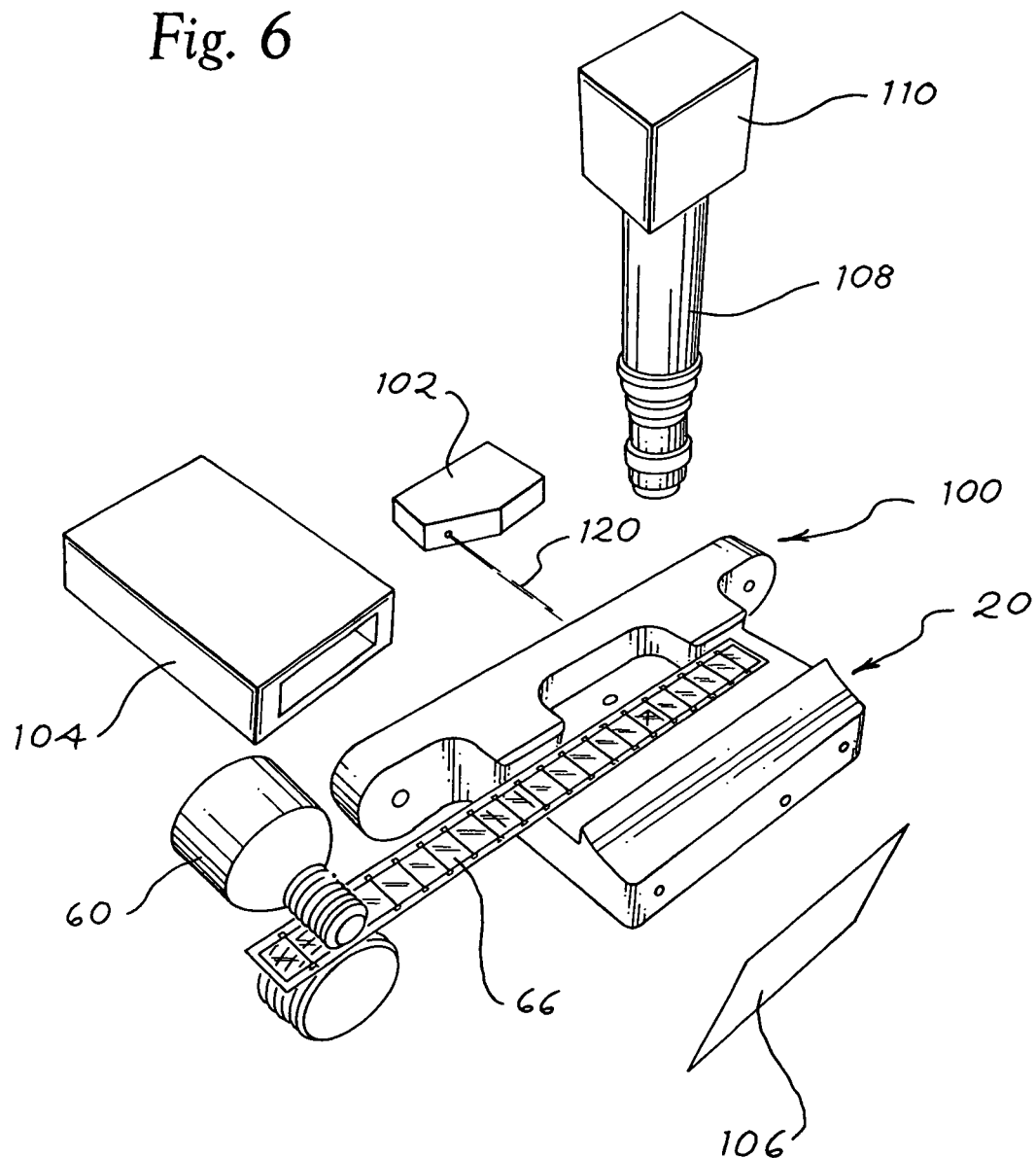
FIG. 6 is an exploded perspective view of an image capture assembly in accordance with an embodiment of the present invention.

FIG. 6 depicts one embodiment of the image capture assembly 100 according to the present invention. The image capture assembly 100 comprises film gate assembly 20, a position sensor 102, a light source 104, a variable focal length lens 108, and a digital imaging device or camera 110. The image capture assembly 100 may also include other components such as a mirror 106. The image capture assembly is configured so that each film frame image is scanned when it is correctly registered within the film gate assembly 20. By interrogating the position of the perforations associated with each frame of the film, a light source 104 and a digital imaging device 110 can be triggered in synchronization. In this manner, a digital image can be produced from each film frame in sequence. Images captured by the digital imaging device 110 can be stored in a computer readable medium such as a hard drive, disk array, database, or the like.

In operation, the capstan film drive assembly 18 drives film 66 past the film gate assembly 20. The position sensor 102, as described in greater detailed herein, is configured to trigger one pulse for every frame of film that passes. Each pulse accurately indicates the passing of a short but definite length of film past the capstan film drive assembly 18. By counting the number of pulses transmitted by the position sensor, the length of film traveling past the lens 108 and digital camera 110 can be determined.

The light source 104 optically transmits the film frame image to the digital camera 110. In one embodiment, the light source 104 is a strobe light. Preferably, the strobe light 104 flashes when the film frame to be captured is correctly positioned and centered relative to the digital camera 110. In order to determine when the film frames are positioned, pulses from the position sensor 102 are detected and counted as film 66 travels past the film gate assembly 20.

By using a strobe light 104 that flashes only when one film frame is before it, only one image is optically transmitted to the digital camera 110 at any one time. By correctly synchronizing the strobe flash with correct registration of the film frame within the gate, there is no blending or dissolving of the captured image resulting from adjacent film frames. Since the strobe light 104 preferably flashes quickly, the digital camera 110 perceives no movement of the film 66 at the time of image capture. From the viewpoint of the digital camera 110, the flash of the strobe light 104 effectively freezes the film frame to be captured, even though the film 66 is in constant motion.

The image generated by the strobe 104 flashing through the film frame is transmitted to a high quality variable focal length lens 108, which inverts the image before sending it on to the digital camera 110. In one embodiment, light from the strobe light source 104, located below the film gate assembly 20, is reflected off a mirror 106 also located under film gate assembly 20 to redirect the light emitted by the strobe light 104 up towards the film. Light from the illumination source 104 is transmitted through the film 66 and is captured by the lens 108 and camera 110. Depending on the geometry and space constraints of the image capture assembly 100, additional mirrors may be used to redirect the path taken by the light from the strobe to the camera. Similarly, the assembly can be configured so that light from the strobe 104 passes directly through the film frame to be captured to the lens 108 and camera 110. A direct optical path between the film frame and the camera is preferred to improve image quality and reduce geometric image distortion.

The digital camera 110 is a color, charge-coupled device (CCD) camera responsive to the optical transmission of light images upon it such that each strobed image is discretely captured in a single digital image. A CCD camera can trigger all of the pixels in the imaging matrix at once to simultaneously capture the entire image at the same time. In contrast, a line scanning image camera creates images by scanning consecutive horizontal lines in the image frame as the film passes, making the line scanning camera image susceptible to minute variations in scanning speed and causing noticeable differences in the height of each successive image.

Use of a strobe light and CCD camera configuration to capture the film permits the film to move through the film gate assembly 20 continuously during scanning, without the need to stop the film intermittently during scanning. Repeated intermittent stopping of the film during scanning may cause potential damage to old or fragile film.

In a preferred embodiment of the invention, the digital camera 110 is a Prosilica GE-1660C capable of capturing images at a resolution of 1600×1200 pixels per image or GE-4900C camera capable of capturing images at a resolution of 4872×3248 pixels, with an exposure time of six microseconds at a rate of up to 34 frames per second.

In a preferred embodiment, the light source 104 is provided by a Perkin Elmer MVS 5000 machine vision strobe light. The strobe produces a short duration, high intensity light pulse with a color temperature of 6400 Kelvin. When operated in conjunction with a CCD video camera 110, the light provided by the light source 104 backlights the film 66, optically freezing the film's motion and eliminating blur.

The operation of the strobe light 104 and the CCD camera 110 are synchronized during image capture. In a preferred embodiment, the strobe is fully illuminated for 35 milliseconds but the image capture occurs during the middle of the strobe flash cycle for a image capture duration of 20 milliseconds. By capturing the image during the middle of the strobe flash cycle, the camera 110 effectively captures the digital image at the brightest peak of the strobe light. It will be recognized that the duration of the strobe light and camera exposure time may be controlled and adjusted.

The operation of the position sensor 102 to determine relative film position now be described in further detail. In one embodiment of the present invention, the position sensor 102 is a high precision retro-reflective laser emitting position sensor of the type typically used in process control and measurement applications, such as the OPDK 14P3903/S35A retro-reflective sensor from the Baumer Company. A retro-reflective laser is a distance measuring optical device that operates by a transmitting a laser beam towards a reflective polarizing target. When the laser beam strikes the target, a certain amount of the laser light is polarized and reflected back toward the sensor. When the beam is optically interrupted, a circuit within the sensor is able to distinguish between the polarized and non-polarized light returning to the sensor. Such a sensor can thus be used to trigger external events based on the interruption of the laser beam.

Figure 7:
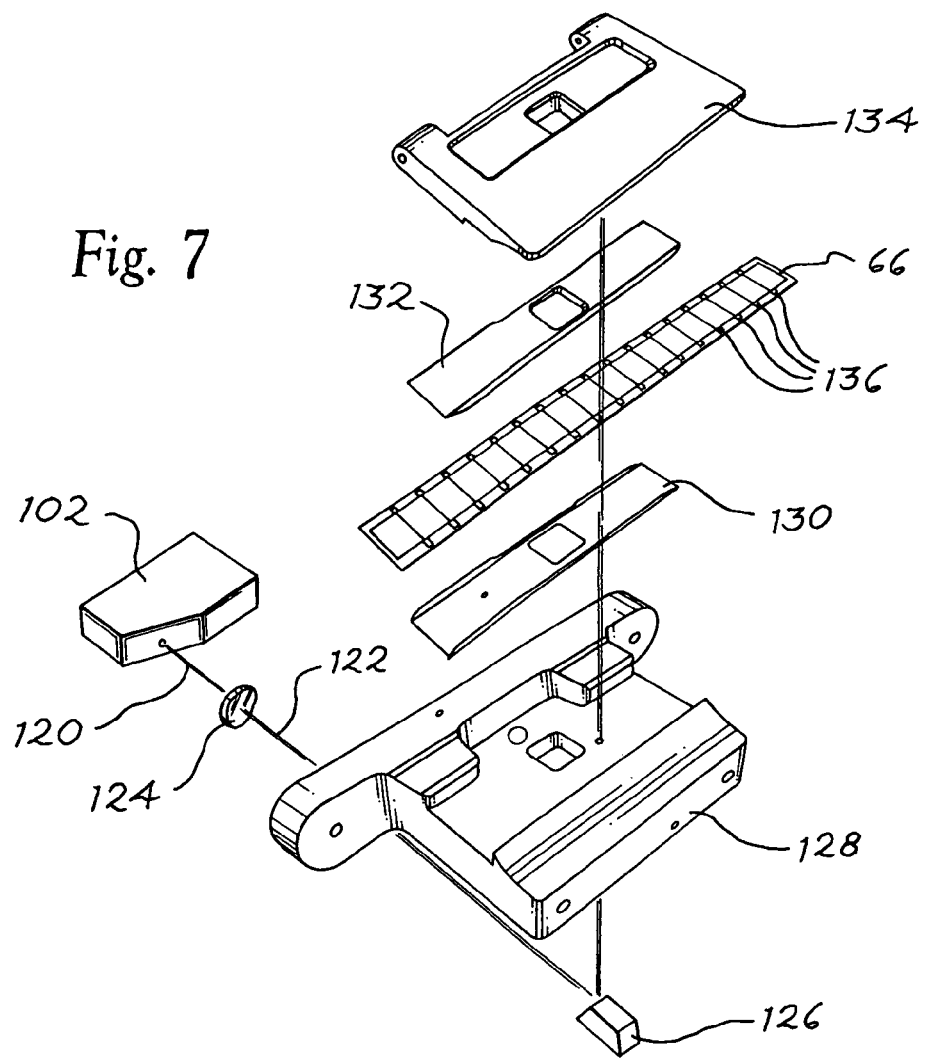
FIG. 7 is an exploded perspective view of the components involved in image registration in accordance with an embodiment of the present invention.
Figure 8:
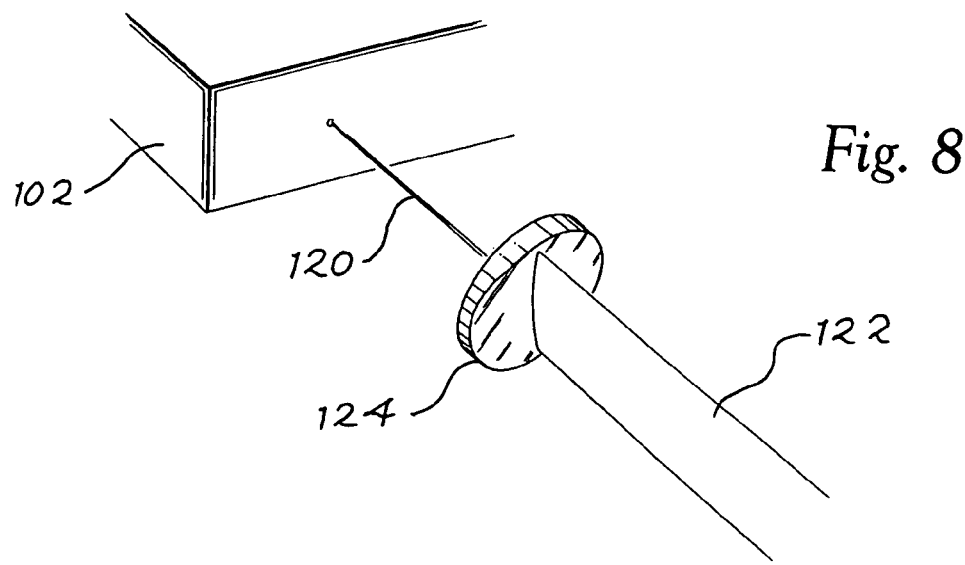
FIG. 8 is a perspective view of the position sensor and the anamorphic lens in accordance with an embodiment of the present invention.

Referring to FIGS. 7 and 8, the retro-reflective laser emitting position sensor 102 emits a laser beam 120. The laser beam 120, which in one embodiment is emitted from a class 1 visible diode laser, is generally emitted as a round beam. The laser beam 120 is passed through an anamorphic lens 124, which reshapes the laser beam by expanding it along an axis to form a reshaped flat laser beam 122. In a preferred embodiment, the laser beam 120 is emitted as a round beam that is five thousandths of an inch in diameter. In the configuration shown in FIG. 7, the reshaped laser beam 122 is redirected upward at a right angle by reflection on a surface mirror 126 angled at 45 degrees. It is understood that depending on the configuration of the position sensor, a surface mirror 126 may be unnecessary.

The reshaped laser beam 122 is directed through the lower gate portion 128, lower guide plate 130, the film perforation 136, and the upper guide plate 132. A small polarizing reflector (not shown) in the upper gate portion 134 polarizes the laser beam and reflects it back through the film perforations 136. The reflected beam is again redirected by the surface mirror 126, through the anamorphic lens 124 and into the position sensor 102.

Through detection of the optical interruption of the laser beam, the position sensor 102 is thus able to detect when the film has advanced such that a film frame is aligned under the CCD camera for image capture. Preferably, the position sensor 102 provides a triggering signal activating the strobe light 104 and CCD camera 110 based on the detection of the trailing edge of the film perforation 136.

As film is moved by sprocket driven systems, the leading edge of a film perforation is engaged by the sprocket. Over time and repeated contact with sprocket teeth, the leading edge of the film perforation may be deformed or damaged by mechanical stress. This damage may become progressively worse with each successive viewing of the film. Since the leading edge of the perforation defines the vertical position of the adjacent image, any inconsistency in the position of this leading edge will cause sequential images to appear to jump vertically, a condition referred to as jitter.

By contrast, a film projector claw or sprocket rarely makes contact with the trailing edge of a perforation, which are often in pristine condition. Since the vertical position of each film frame is based upon the position of the associated perforation, any damage to the perforation's edge with cause a discontinuity in the vertical position of the film relative to the perforation. This condition is referred to as vertical misregistration.

A logic inversion circuit may be used to invert the output from the laser position sensor so that the position sensor 102 triggers based on the trailing rather than the leading edge of the perforation. In this manner, film may be scanned without regard to the extent of damage to the leading edge of the perforation while avoiding problems associated with jitter and vertical misregistration.

In one embodiment, the retro-reflective laser sensor provides a transistor to transistor logic (TTL) signal output. The sensor provides a triggering signal for activating the CCD camera and strobe light. When a perforation is detected, the sensor receives a polarized reflection from the emitted laser beam whereupon the sensor's output signal changes from an electrically low condition, such as 0 volts, to a high condition, such as +5 volts. However, in this condition, the triggering signal would be based on the leading edge rather than the trailing edge. In order to trigger based on the trailing edge of the perforation, the signal is electronically inverted so that the sensor registers in the low condition on the leading edge and in the high condition when the trailing edge of the perforation interrupts the laser beam.

Figure 9:
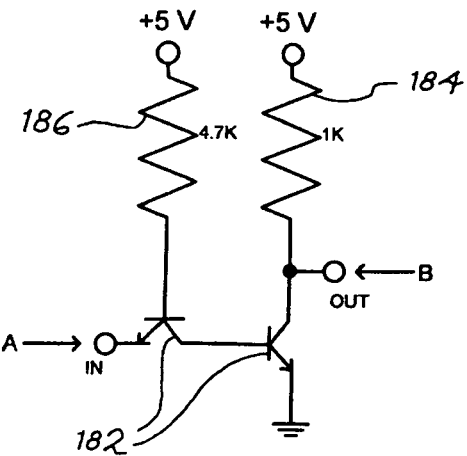
FIG. 9 is a circuit schematic of an inversion circuit in accordance with an embodiment of the present invention.

An example of such an inversion circuit is shown in FIG. 9. The inversion circuit 180 is constructed using two 2NR4124 NPN silicon transistors 182, a 1 kΩ, ¼ watt resistor 184, and a 4.7 kΩ, ¼ watt resistor 186. A logic 1 input applied to the input of the inversion circuit will be inverted to a logic 0 output. By inverting the TTL signal in this manner, the position sensor provides a triggering signal upon detection of the trailing edge of the perforation rather than the leading edge. It will be understood by those of skill in the art that other configurations of inversion circuits may be used or implemented. In another embodiment, the inversion circuit may be switched on or off by the user operator. In this way, the operator is given the choice to select either the leading edge or trailing edge of the film perforation as a triggering reference.

Figure 10:
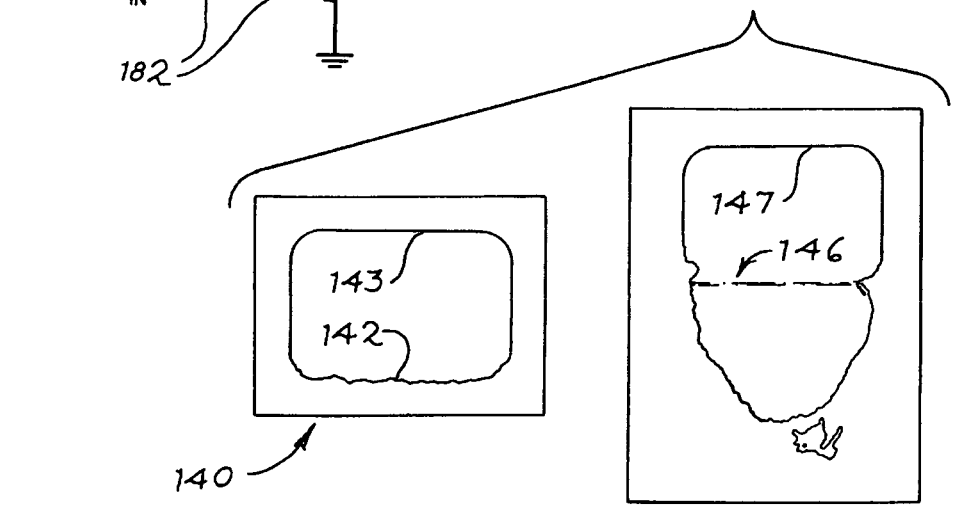
FIG. 10 is an enlarged top view of a slightly worn film perforation and a severely damaged film perforation.

FIG. 10 shows an enlarged view of a slightly worn film perforation 140 and a severely damaged perforation 145. In the slightly worn film perforation 140, the leading edge 142 exhibits a small amount of roughness compared to the trailing edge 143. By contrast, the leading edge 146 of the severely damaged perforation 145 is completely missing, although the trailing edge 147 is still intact.

Since the trailing edge of the film perforation is less susceptible to damage, it is preferable to use the trailing edge detection for more reliable for accurate film registration and positioning. By triggering based on the trailing edge of the perforation, damage sustained by the perforation's leading edges can be disregarded and potential vertical misregistration of scanned images can be avoided.

Figure 11:
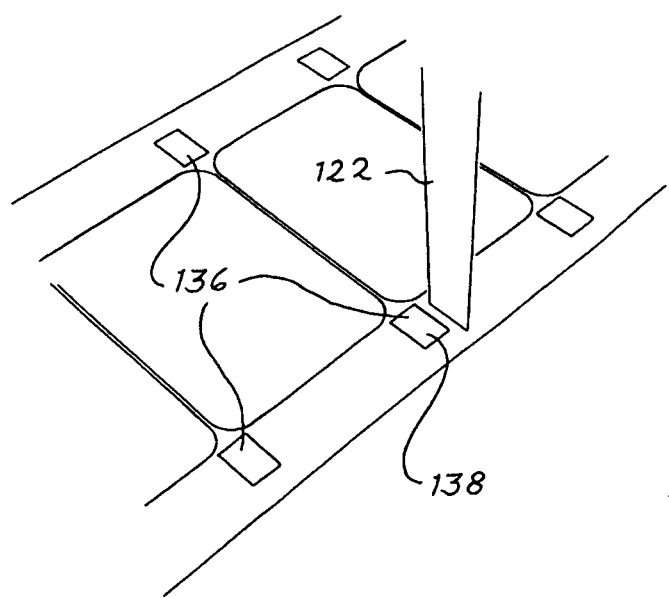
FIG. 11 is a top perspective view of the interaction between the reshaped laser beam emitted by the position sensor and the film perforations in accordance with an embodiment of the present invention.

As shown in FIG. 8 and discussed above, the laser beam 120 is preferably passed through an anamorphic lens 124 and reshaped. By passing the laser beam 120 through an anamorphic lens 124, the beam is expanded along an axis and reshaped from a round beam to a line beam. As shown in FIG. 11, the reshaped beam 122 more closely matches the shape of the film perforation edge. In one embodiment, the resulting beam is approximately the full width of a film perforation, enabling the sensor 102 to sample a larger area. This arrangement makes the sensor much less sensitive to small imperfections that may occur along the edge of the film perforation and improves the accuracy of the sensor 102. Use of a line laser beam 122 to detect the trailing edge of a perforation is more accurate and consistent than with a laser beam with a circular cross section, since it is less sensitive to small imperfections along the edge of the perforation.

Figure 12:
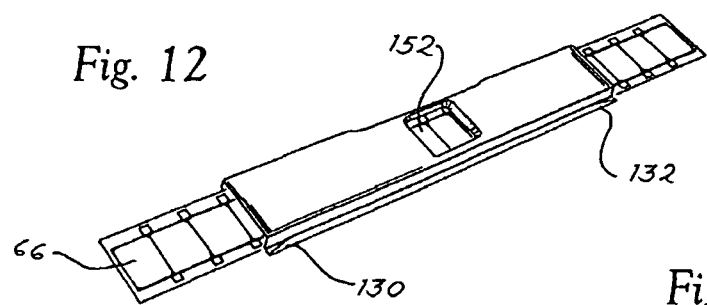
FIG. 12 is a front perspective view of the guide plates and the film strip in accordance with an embodiment of the present invention.
Figure 13:
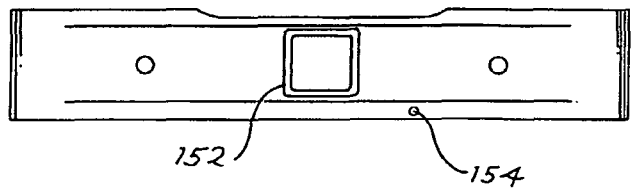
FIG. 13 is a top view of a film guide plate in accordance with an embodiment of the present invention.

Referring to FIG. 12, a pair of polished guide plates 130 and 132 contact the bottom and top of the edges of film 66. The shape of the lower guide plate 130 is a mirror image of the shape of the upper guide plate 132. Referring to FIG. 13, in one embodiment the plates are relieved in the center so that only the outer edges of the film are contacted by the guide plate and the image area in the center of the film is not in contact with the guide plate. The guide plate includes an aperture hole 152. The aperture hole 152 is preferably slightly larger than the image area of a film frame to ensure that the entire height and width of the film frame on film strip 66 is available for scanning. If the aperture hole 152 is smaller than the image area of the film frame, the outer edges of the film frame will be cropped during scanning. This technique, sometimes referred to as edge masking, is sometimes used to mask slight variations in the frame position.

To determine the position of the film during scanning, the position sensor 102 transmits a laser beam through a small hole 154 in the lower guide plate 130. When the perforation passes over the hole, the position sensor 102 triggers and causes the digital camera 110 to capture an image of the film frame that is aligned with the aperture 152.

In one embodiment, the registration accuracy of the system may be further improved by positioning the laser beam the distance of one frame below the aperture. The spatial displacement between the aperture 152 and the laser hole 154 recreates the spatial relationship that exists between the aperture and the pull down claw in motion picture cameras. During operation of the present invention, the digital camera 110 is triggered by the same perforation that was originally used to position film in the motion picture camera when the film was originally exposed. This enables the scanner to reference the same perforation used by the original camera when the film frame was photographed.

The film scanning system 10 includes a film gate assembly 160. The purpose of the film gate assembly 160 is to accurately position the motion picture film during scanning. The film gate assembly of the present invention will now be described in greater detail.

Figure 14:
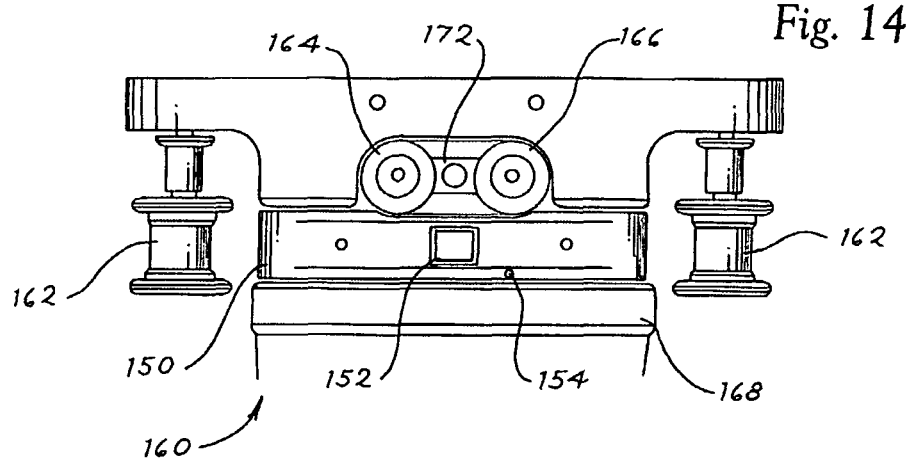
FIG. 14 is a top view of a film gate assembly in accordance with an embodiment of the present invention.

As previously discussed, the film gate assembly 160 comprises a lower gate portion 128, a lower guide plate 130, a upper guide plate 132, and a upper gate portion 134. FIG. 14 shows one embodiment of the film gate assembly 160 with the upper gate portion 134 removed for clarity. The film gate assembly 160 includes guide rollers 161 and 162 on the supply and take-up end of the film gate. Film is passed around the guide roller 161, between the lower guide plate 130 and upper guide plate 132, and passed around guide roller 162. The guide rollers 161, 162 and guide plate 130, 132 make contact with the outer edges of the film and do not contact the film's image area.

The film gate assembly 160 can be opened to permit threading of the film 66. In one embodiment, the upper gate portion 134 is spring loaded and horizontally pivotable relative to the lower gate portion 128. When the film gate assembly 160 is opened to thread film stock, the upper gate portion 134 may be pivoted up to a 90 degree arc. In this way, maximum clearance is accomplished for facilitating the threading of the film stock. When the gate is closed, the upper gate portion 134 applies downward pressure, holding the edges of the film flat under spring tension. This arrangement enables to film scanner to handle film which has become curled or fluted. By being spring-loaded, the upper gate portion 134 can move up and away from the film if an overlap splice or other thicker than normal film is encountered. In another embodiment, the upper gate portion 134 is detachable from lower gate portion 128.

The film is positioned laterally within the gate assembly 160 by two linear guide bearings 164, 166. The linear guide bearings 164, 166 apply side pressure to keep the film in contact with a fixed film edge guide 168. In a preferred embodiment, the edge guide 168 is equipped with sapphire wear plates for extended durability.

Figure 15:
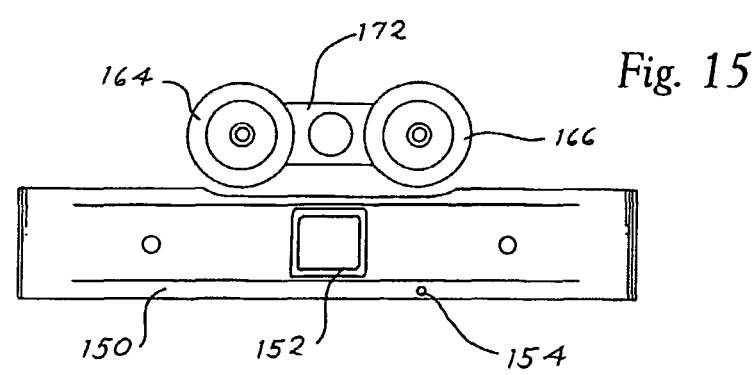
FIG. 15 is a top view of the linear guide bearings and the film guide plate in accordance with an embodiment of the present invention.

One embodiment of the linear guide bearings 164, 166 is shown in FIG. 15. Linear guide bearings 164 and 166 are mounted to an arm 172 pivotable about an axis perpendicular to the edge of a film strip. The pivoting arm 172 is spring loaded to apply lateral force towards the film strip held by film guide 150. The pivoting arm 172 permits linear guide bearings 164 and 166 to move toward and away from the edge of the film while also pivoting iii relation to each other. In another embodiment, the linear guide bearings 164, 166 are independent of each other. Other linear guide bearings configurations will be apparent to those of skill in the art.

The linear guide bearings 164, 166 provide a continuous lateral force on the edge of the film with little friction. Lateral instability caused by damage to the edge of the film is thus corrected and the frame-to-frame registration accuracy in the lateral direction is consistent between sequential film frames.

The lateral alignment of film frames with the aperture hole 152 between film guide plates 130 and 132 is continuously maintained by the linear guide bearings 164, 166 exerting a lateral force on the film strip to keep one lateral edge of the film strip against the fixed film edge guide 168. When a misaligned film splice or torn edge is encountered in the film, the spring-loaded linear guide bearings 164, 166 ride up and over the uneven edge of the film, keeping the film aligned with the edge guide 168. The linear guide bearings are also able to compensate for shrunken film by exerting pressure on the side of the film strip to keep the film edge against the edge guide 168.

Film guide plate 150 is comprised of lower guide plate 130 and upper guide plate 132. In a preferred embodiment, the lower guide plate 130 and upper guide plate 132 include a relief 174 on the lateral edge adjacent to the linear guide bearings 164, 166. This relieved section of the film guide plate 150 allows the linear guide bearings to maintain contact with shrunken film that has a narrower width than normal.

Use of the linear guide bearings 164, 166 and a fixed film edge guide 168 also provides a mechanism for avoiding gate weave. Gate weave is a condition where the series of scanned images drifts left and right due to lateral movement or improper lateral registration of the film frame during archival. Motion picture cameras reference the edge of the film to establish lateral alignment rather than the perforations because the perforations of the film strip drift left and right due to loose manufacturing tolerances. Gate weave is avoided by laterally aligning the edge of the film strip in continuous contact with the fixed film edge guide 168 rather than by registering the film frame to be captured using the side edges of a film perforation.

It is contemplated that the film gate assembly 160 is a complete unit in itself. The proper relationship of the film gate assembly 160 to the optical axis of the scanner may be established by indexing pins extending from the film scanning system 10. This arrangement permits removal of the film gate and replacement without subsequent readjustment.

Figure 16:
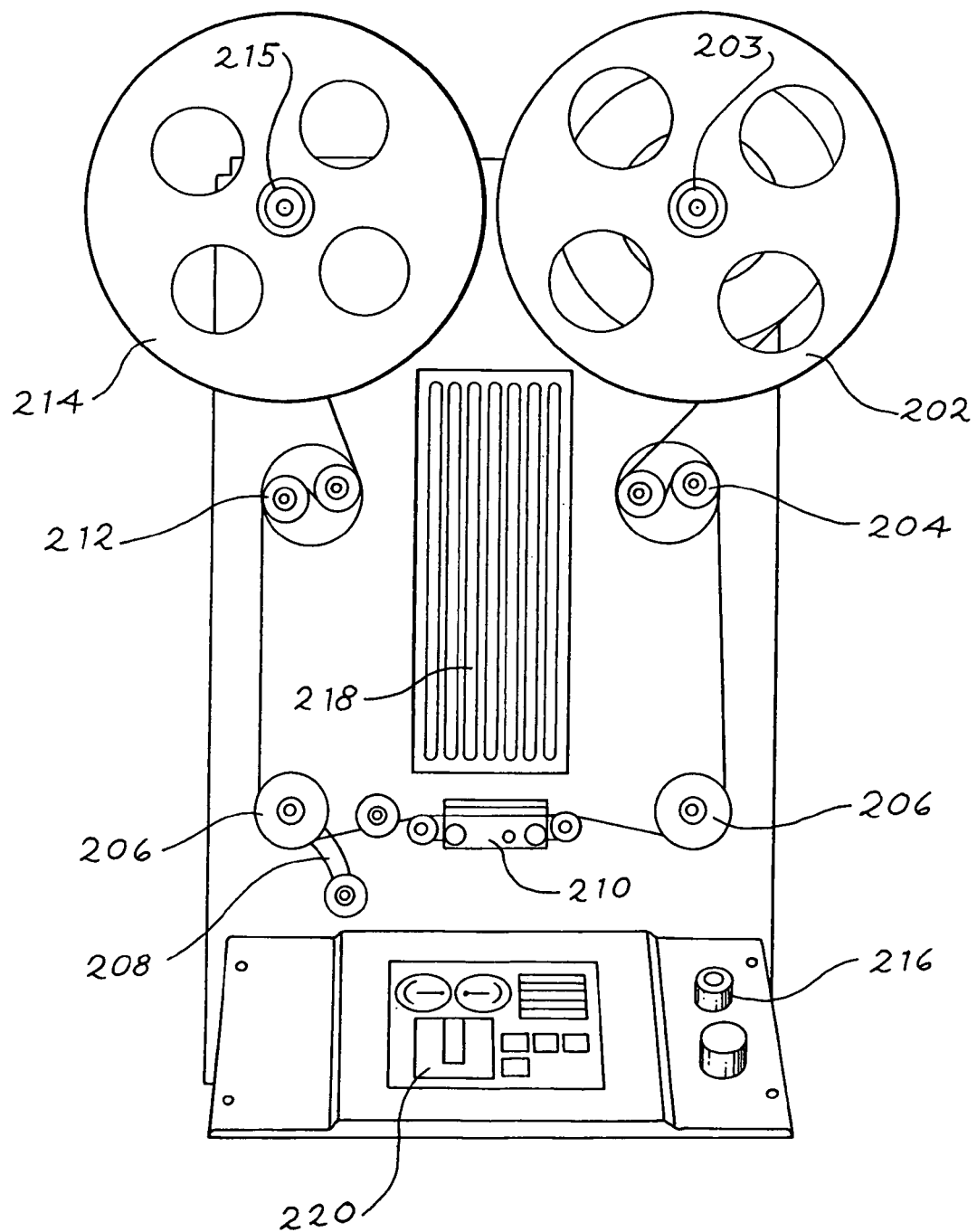
FIG. 16 is a front view of a film scanning system in accordance with an embodiment of the present invention.

Operational control of the film scanning system is performed by a user control panel interface. The overall operation of the system of a preferred embodiment of the present invention will now be described. Referring to FIG. 16, the film scanning system 200 includes supply reel 202, supply tension sensor roller assembly 204, return rollers 206, a capstan film drive assembly 208, a gate assembly 210, a return roller 206, take-up tension sensor roller assembly 212, and take-up reel 214 around which film is threaded. The film scanning system 200 also includes a power button 216, camera 218, variable focal length lens 219, and a user interface 220. The film scanning system 200 is in communication with an external computer and hard drive array. Images captured by the camera 218 may be sent to the external computer.

In operation, power is applied to the film scanning system 200 by depressing the power button 216. After inspecting the film scanning system 200 to ensure the components are clean and free of dust or other contaminants, a film gate assembly 210 appropriate to the size of the film being scanned is attached. The film gate assembly 210 is mounted to the film scanning system 200 on two alignment pins provided on the front of the film scanning machine 200. The film gate assembly 210 may be secured by tightening thumbscrews. To facilitate threading of the film, an upper portion of the film gate assembly 210 may be opened or removed to allow complete access to the film path within the film gate assembly 210.

A reel of film is mounted onto the supply reel spindle 203 and secured with a locking retainer. The film is then threaded around the components of the film transport assembly, through the film gate assembly 210, and onto the take-up reel 214 mounted on a take-up spindle 215. After checking that the film has been properly threaded, the film gate assembly 210 is closed.

Figure 17:
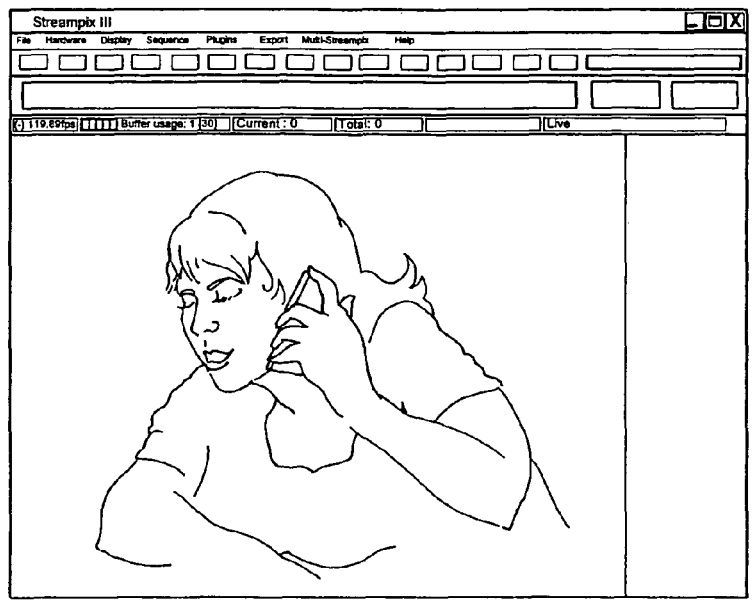
FIG. 17 is a sample screen output displayed by the image capture software.

FIG. 17 shows a screen shot of the image capture program executed on the external computer. A variety of image capture software programs may be used. In a preferred embodiment, the image capture software is Streampix 3, a commercially available product manufactured by NorPix, Inc. The software is able to record and manage a large number of individual images that are generated by the camera 218. The image capture software also provides several interfaces whereby a user can control variables such as brightness, contrast, gamma level, and other image characteristic variables.

Figure 18:
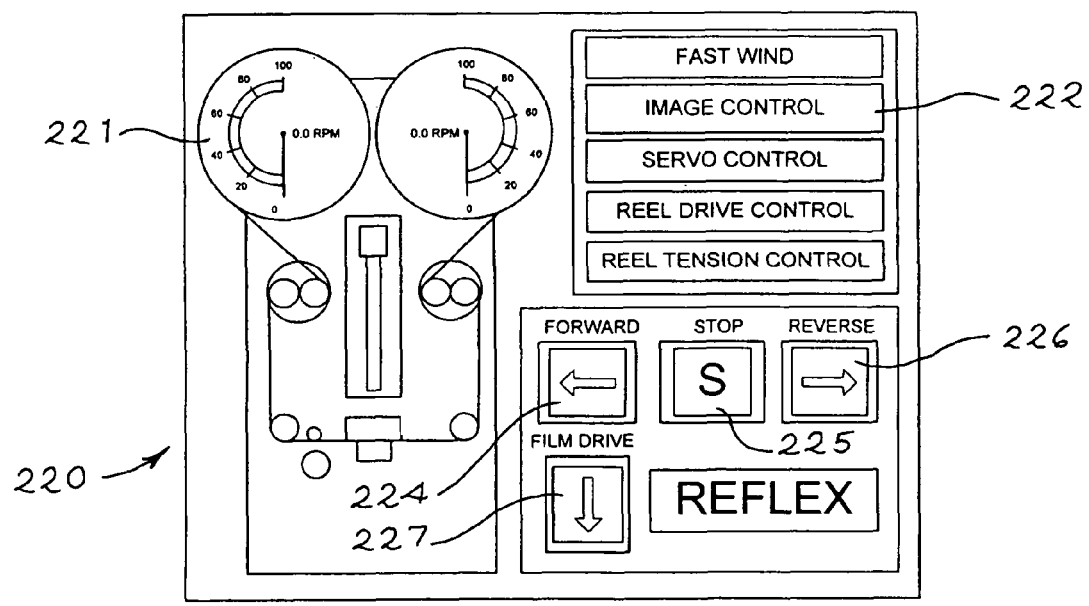
FIG. 18 is a sample screen output displayed by the user interface on the film scanning system in accordance with an embodiment of the present invention.

FIG. 18 shows an embodiment of the user interface 220. The user interface 220 may be controlled by keyboard, mouse, touch sensitive screen, or other input means known to those of skill in the art. In the embodiment shown in FIG. 18, the user interface 220 is a touch sensitive screen that information regarding the state of the film scanning system 200. The display may include a representation of the system status display 221 showing the overall status of the film scanning system 200. The user interface 220 also displays a number of submenu choices 222. Control of the film transport assembly of the film scanning system 200 may be controlled by the forward 224, stop 225, reverse 226, and film drive 227 buttons shown. The forward 224 and reverse 226 buttons control the frame speed, and in some embodiments the direction, in which the film is transported through the system. The film drive button 227 causes the pinch roller 234 on the capstan drive system 230 to rotate up until it makes contact with the capstan roller 232.

Figure 19:
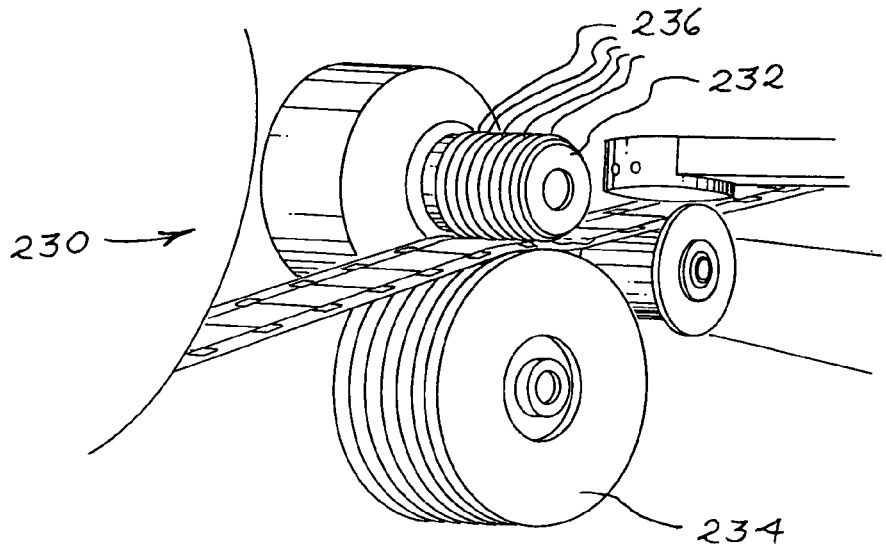
FIG. 19 is a front perspective view of the capstan film drive assembly in accordance with an embodiment of the present invention.

As shown in FIG. 19, the capstan drive system 230 includes a capstan roller 232 and a pinch roller 234. Both the capstan roller 232 and the pinch roller 234 comprise a number of O-rings 236 arranged to provide sufficient frictional contact with the film to drive the film 201. The O-rings 236 are preferably fabricated from non-abrasive compounds of a specific durometer material. In a preferred embodiment, the O-rings 236 are fabricated of a non-abrasive neoprene compound of approximately durometer 40. The O-rings 236 are easily cleaned with isopropyl alcohol and can be quickly removed and replaced by the user operator if needed.

Figure 20:
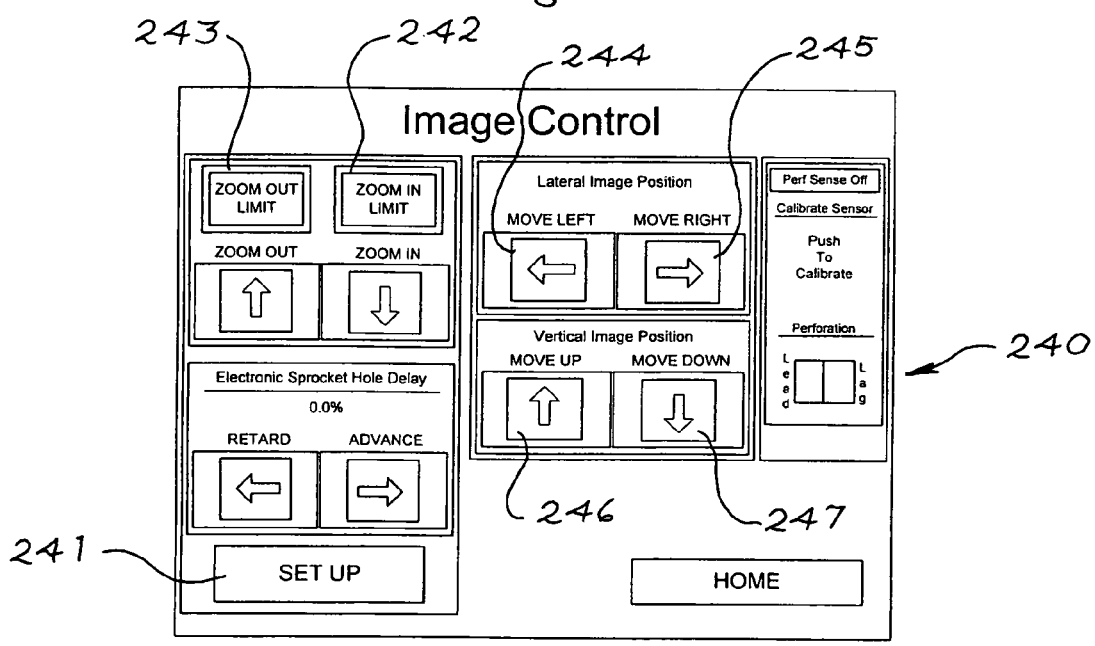
FIG. 20 is a sample screen output of the image control submenu displayed by the user interface on the film scanning system in accordance with an embodiment of the present invention.

To begin the film transfer process, the operator accesses the Image Control submenu through the submenu buttons 222 in the telecine user interface 220. An embodiment of the Image Control submenu 240 is shown in FIG. 20. By activating the setup button 241, the strobe light in the film scanning system 200 will flash at the rate of five flashes per second. The digital camera 218 receives and displays the images on the display monitor. The operator can observe use the displayed images to observe the effects of image adjustments made in real time while the film remains stationary.

The relative size and position of the image may be adjusted if needed. While observing the video images displayed by the image display monitor, the operator may zoom in or zoom out by touching the appropriate buttons 242, 243 provided on the Image Control submenu 240. The lateral position of the film frame may be adjusted by the move left 244 and move right 245 buttons, which cause the digital camera 218 to move laterally in relation to the film 201. To adjust the vertical position of the scanned image, the operator may move up 246 and move down 247 buttons, which cause the perforation position sensor to move laterally in relation to the gate and thus raise or lower the image in relation to the position of the digital camera 218. Through these adjustments, the operator can align the image captured by the digital camera 218 so that no picture information is cropped.

Referring to FIG. 18, the operator can begin the scanning process by touching the forward button 224. The film scanning system 200 will transport the film 201 at a default speed of 24 frames per second or to another desired speed set by the operator. In one embodiment, the frame rate may be adjusted to between one to thirty-four frames per second by touching the forward 224 and reverse 226 buttons. To stop the image capture process, the operator activates the stop button 225. The digital camera 218 records a continuous stream of images, which is stored on an external hard drive array. The resultant digital images may also be stored on external hard drives, exported or encoded onto Blu-ray discs, or converted to full-motion digital video files.

Referring to FIG. 21, the Servo Control submenu 250 can be accessed to monitor and adjust the film transport servo system parameters. As a safety measure, an operator must first activate the Servo Disable icon 251 prior to adjusting any of the values in the submenu 250. Activation of the Servo Disable icon 251 electronically disconnects the servo motor and isolates it from the control system to prevent the servo motor from behaving erratically should the operator accidentally enter an erroneous value into one of the value registers 252. When the new parameters have been entered into the appropriate value registers, 252, the operator may activate the Servo Disable icon 251 a second time to restore control to the servo motor. If the operator has entered an incorrect value into a value register 252, the Servo Disable icon 251 will not restore control over the servo motor. Instead, the register containing the incorrect value will be highlighted to indicate the fault to the operator for correction.

Referring to FIG. 22, the Run Mode Reel Parameters submenu 260 is used to display and adjust the operational speed and torque of the reel motors controlling the supply reel 202 and take-up reel 214. When the film being scanned is very brittle, the operator may choose to bypass the tension sensors 204, 212 when threading the film. Bypassing the tension sensors 204, 212 reduces the amount of bending force applied to the film 201. The Run mode Reel Parameter submenu 260 include an Auto Tension switch 261. If the tension sensors 204, 212 are bypassed, the film scanner system 200 will not operate unless the Auto Tension switch 261 is disengaged because the system assumes that the film is not properly threaded.

Figure 23:
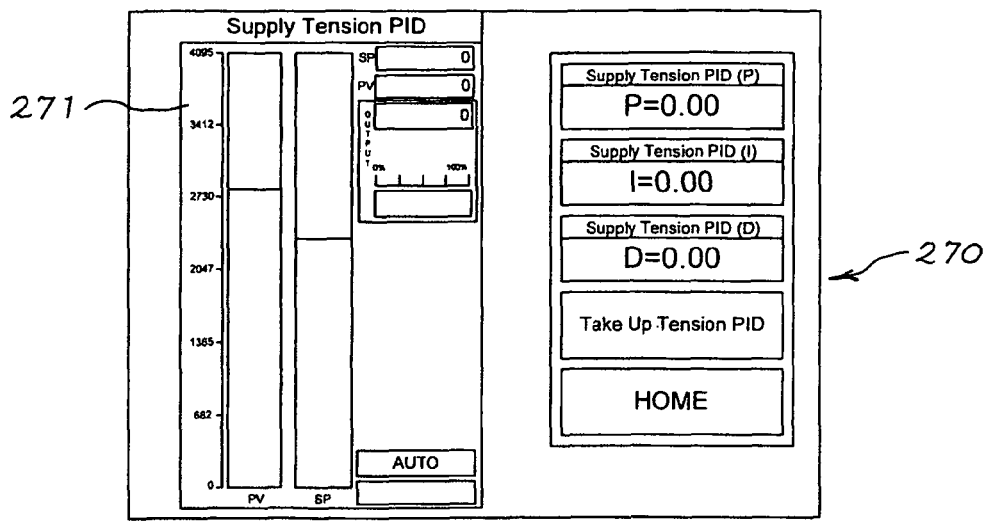
FIG. 23 is a sample screen output of the supply tension PID submenu displayed by the user interface on the film scanning system in accordance with an embodiment of the present invention.
Figure 24:
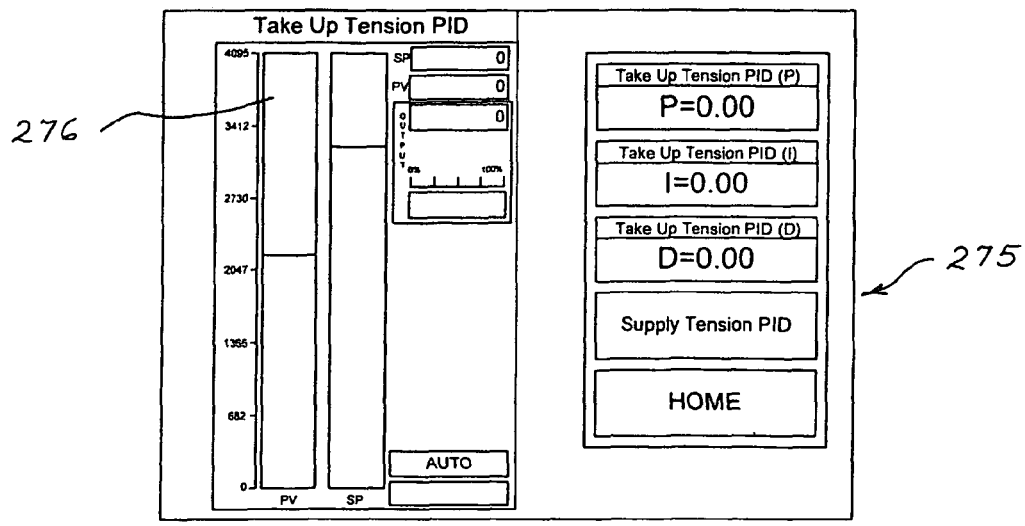
FIG. 24 is a sample screen output of the take-up tension PID submenu displayed by the user interface on the film scanning system in accordance with an embodiment of the present invention.

Referring to FIGS. 23 and 24, the rotational position and end point settings of the tension sensors 204, 212 may be adjusted by accessing the Supply Tension Proportional, Integral, and Derivative (PID) submenu 270 and Take-Up Tension Proportional, Integral, and Derivative (PID) submenu 275. The submenus display a bar graph 271, 276 indicating the actual tension sensor position alongside a graph representing the desired set point position. These interfaces are used to set acceleration rates and adjust tension control to ensure gentle film handling characteristics at all operating speeds.

Figure 25:
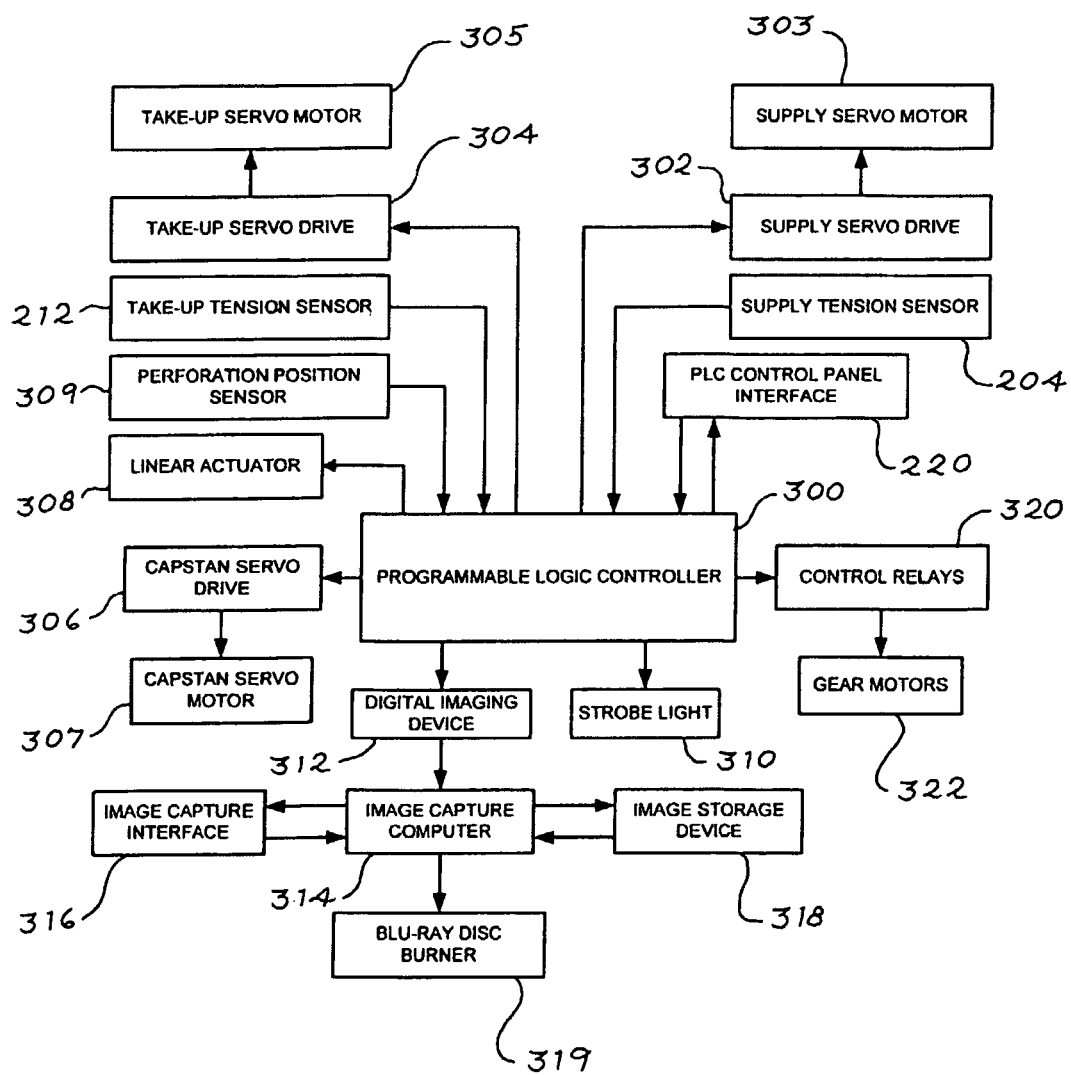
FIG. 25 is a diagram showing the data relationship between the programmable logic controller and various hardware components of the film scanning system in accordance with an embodiment of the present invention.

Tension sensor roller assemblies 204, 212 measure the rotational deflection of the tension roller and generates an electrical output signal corresponding to the angle of deflection of the tension roller. Referring to FIG. 25, the electrical signal is provided to a programmable logic controller (PLC) 300.

In one embodiment, the signal generated by the tension sensors 204, 212 vary in frequency in direct proportion to the rotational position of the tension sensors 204, 212. The PLC 300 interprets the signals from the sensors 204, 212 and generates a proportional output signal which is communicated to servo motor drives 302, 304 corresponding to the supply reel 202 and take-up reel 214. The servo drives 302, 304 in turn provide appropriate control signals to the input circuits of the servo drive motors 303, 305 which are attached to the supply reel 202 and take-up reel 214.

The operator control panel interface 220 maintains software control to adjust the amount of torque being applied to the film 201 during operation. The system uses a proportional, integral, and derivative (PID) control loop feedback mechanism of the type used in industrial control systems. A PID controller attempts to correct the error between a measured process variable and a desired set point by calculating and then outputting a corrective action that can rapidly adjust the processes accordingly to minimize error. This arrangement enables the film transport assembly to apply a consistent amount of pressure to the film 201 during operation without regard to the continually changing diameter and mass of the film contained on either of the two reels 202, 214.

The PLC 300 also controls the operation of the capstan servo drive 306 and servo motor 307 in the capstan drive system 208. Operation of the engagement and disengagement of the pinch roller in the capstan drive system 208 is also controlled by the PLC 300 through the use of an electromechanical linear actuator 308. The linear actuator 308 is mechanically spring-loaded to provide consistent positive pressure between the capstan roller and the pinch roller and to allow accommodation of film 201 that may be thicker than normal due to overlapped film splices.

As previously described above, film frame registration is accomplished through the use of a position sensor 309 that senses the passing of each film perforation through the film gate assembly 210. When the film 201 passes through the film gate assembly 210, the perforation position sensor 309 sends a digital signal to the PLC 300 corresponding to the position of each passing perforation. When the PLC 300 receives a signal from the position sensor 309, the PLC 300 sends out two synchronized control signals which simultaneously trigger strobe light 310 and digital imaging camera 312. The digital imaging camera temporarily stores and assimilates the electronic picture information before sending it to a computer-based image capture system 314. As previously described, digital image capture may be accomplished through the use of commercially available software interfaces 316. Storage of the captured image may be accomplished through commercially available hard drive systems 318 or Blu-ray disc burners 319.

During operation of the film scanning system 200, the size and positioning of the film frames being scanned may be altered by making adjustments via the operator user interface 220. In response to the adjustments, the PLC 300 energizes a variety of control relays 320 which in turn control a variety of gear motors 322. Control relays 320 and gear motors 322 may be used for a number of adjustment functions. Vertical positioning of the film frame may be adjusted by changing the lateral position of the perforation position sensor 309 relative to the film 201. By energizing control relays, an electromechanical system comprising a gear motor and guide rails physically changes the lengthwise position of the sensor 309 which in turn changes the vertical position of the film 201 relative to the digital imaging device 312. A similar electromechanical system may be used to change the horizontal position of the film by adjusting the lateral position of the camera 312 and lens relative to the film gate. The size of the image can also be altered through the use of still yet another electromechanical system which increases or decreases the focal length of the variable zoom lens.

In order to manage the operation of the present telecine invention, a commercially available programmable logic controller, such as a Productivity 3000 manufactured by SI Direct, running a special software interface is used to provide easy access and control to the features, functions, and operations of the telecine. Without undue experimentation, it is believed that the person of ordinary skill in the art will realize the structure and coding sequences which have been used to realize such software. The type of signals used in the control circuit are known signals and or known signal protocols so that a variety of commands can be passed from the logic controller to the control circuit of the telecine in order to implement the instructions of the operator.

Furthermore, in order to synchronize and activate coordinated operation of the several elements of the present invention, timers, pulse-generators, and pulse receivers are used for signal processing means. Interfaces are present that provide means by which signals can be transferred into and out of the control circuit, such interfaces known to those familiar with the art and including serial and RS-232 interfaces.

Although this invention has been described in the context of certain preferred embodiments and examples, it will be understood by those skilled in the art that the present invention extends beyond the specifically disclosed embodiments to other alternative embodiments and obvious modifications and equivalents thereof. Although this invention has been described in terms of certain preferred embodiments, other embodiments apparent to those of ordinary skill in the art are also within the scope of this invention. Accordingly, the scope of the invention should not be limited by the particular disclosed embodiments described above, but defined only by the scope of the claims which follow.

What is claimed is:

1. A digital film scanner for archival and duplication of a series of images from a motion picture film strip comprising a plurality of sequential film frames and a plurality of film perforations, the digital film scanner comprising:
   a supply reel;
   a take-up reel;
   a film transport assembly for transporting film from the supply reel to the take-up reel, the film transport assembly comprising:
      a plurality of tension sensor roller assemblies disposed in the film path between the supply reel and the take-up reel for maintaining a consistent tension in the film during transport comprising:
         a plurality of tension rollers;
         a tension sensor connected to the plurality of tension rollers;
         wherein the tension sensor is adapted to detect changes in the tension of the film frictionally engaged with the plurality of tension rollers and wherein the rotation of the supply reel or the take-up reel are adjusted in response to changes sensed by the tension sensor; and
      a capstan drive assembly comprising a plurality of drive rollers including at least two capstan rollers, a pinch roller, and a guide roller, wherein the plurality of drive rollers are frictionally engaged in tangential relation with a film strip threaded between the plurality of drive rollers, whereby the film is transported by rotation of at least one of the plurality of drive rollers;
   an image capture assembly comprising:
      a light source for illuminating a film frame;
      a digital imaging device for digitally recording image data corresponding the illuminated film frame; and
      a position sensor adapted to detect the presence of a film frame for capture by the digital imaging device, wherein the position sensor is adapted to trigger capture of image data corresponding to the illuminated film frame by the digital imaging device;
   a film gate assembly comprising:
      at least one linear guide bearing;
      a fixed edge guide;
      a film gate guide interposed between the at least one linear guide bearing and the fixed edge guide, the film gate guide further comprising a film aperture; and
      wherein the at least one linear guide bearing is in contact with an edge of film in the film gate guide and exerts a force on the edge of the film to move the film in a lateral direction against the fixed edge guide;
   a computer readable medium for storing the image data recorded by the digital imaging device; and
   a user interface for receiving input and commands from an operator.

2. The digital film scanner of claim 1, wherein each of the plurality of drive rollers further comprise a plurality of O-rings circumscribing the each of the plurality of drive rollers.

3. The digital film scanner of claim 1, wherein the image capture assembly further comprises a polarizing mirror and wherein the position sensor of the image capture assembly comprises a retro-reflective laser emitting position sensor adapted to emit a laser beam.

4. The digital film scanner of claim 3, wherein image capture assembly further comprises an anamorphic lens disposed in the path of the laser beam for elongating the laser beam along an axis.

5. The digital film scanner of claim 4, wherein the digital imaging device is triggered by the detection of a film perforation by the position sensor.

6. The digital film scanner of claim 5, wherein the digital imaging device is triggered detection of a trailing edge of a film perforation by the position sensor.

7. The digital film scanner of claim 1, wherein the light source of the image capture assembly provides intermittent illumination.

8. The digital film scanner of claim 7, wherein the light source comprises a strobe light triggered by the position sensor.

9. The digital film scanner of claim 8, wherein the strobe light and the digital imaging device are synchronized and are triggered by the position sensor.

10. The digital film scanner of claim 9, wherein the digital imaging device is a charge-coupled device video camera.

11. The digital film scanner of claim 1, wherein the fixed edge guide of the film gate assembly further comprises sapphire wear plates.

12. A digital film scanner for archival and duplication of a series of images from a motion picture film strip comprising a plurality of sequential film frames and a plurality of film perforations, the digital film scanner comprising:
 a supply reel;
 a take-up reel;
 a film transport assembly for transporting film from the supply reel to the take-up reel, the film transport assembly comprising:
  a plurality of tension sensor roller assemblies disposed in the film path between the supply reel and the take-up reel for maintaining a consistent tension in the film during transport comprising:
   a plurality of tension rollers;
   a tension sensor connected to the plurality of tension rollers;
   wherein the tension sensor is adapted to detect changes in the tension of the film frictionally engaged with the plurality of tension rollers and wherein the rotation of the supply reel or the take-up reel are adjusted in response to changes sensed by the tension sensor; and
  a capstan drive assembly comprising a plurality of drive rollers including a capstan roller, a pinch roller, and a guide roller, wherein the plurality of drive rollers are frictionally engaged in tangential relation with a film strip threaded between the plurality of drive rollers, whereby the film is transported by rotation of at least one of the plurality of drive rollers;
 an image capture assembly comprising:
  a light source for illuminating a film frame;
  a digital imaging device for digitally recording image data corresponding the illuminated film frame; and
  a position sensor adapted to detect the presence of a film frame for capture by the digital imaging device, wherein the position sensor is adapted to trigger capture of image data corresponding to the illuminated film frame by the digital imaging device;
 a film gate assembly comprising:
  at least one linear guide bearing;
  a fixed edge guide;
  a film gate guide interposed between the at least one linear guide bearing and the fixed edge guide, the film gate guide further comprising a film aperture; and
  wherein the at least one linear guide bearing is in contact with an edge of film in the film gate guide and exerts a force on the edge of the film to move the film in a lateral direction against the fixed edge guide;
 a computer readable medium for storing the image data recorded by the digital imaging device; and
 a user interface for receiving input and commands from an operator.

13. The digital film scanner of claim 12, wherein each of the plurality of drive rollers further comprise a plurality of O-rings circumscribing the each of the plurality of drive rollers.

14. The digital film scanner of claim 12, wherein the image capture assembly further comprises a polarizing mirror and wherein the position sensor of the image capture assembly comprises a retro-reflective laser emitting position sensor adapted to emit a laser beam.

15. The digital film scanner of claim 14, wherein image capture assembly further comprises an anamorphic lens disposed in the path of the laser beam for elongating the laser beam along an axis.

16. The digital film scanner of claim 15, wherein the digital imaging device is triggered by the detection of a film perforation by the position sensor.

17. The digital film scanner of claim 16, wherein the digital imaging device is triggered detection of a trailing edge of a film perforation by the position sensor.

18. The digital film scanner of claim 12, wherein the light source of the image capture assembly provides intermittent illumination.

19. The digital film scanner of claim 18, wherein the light source comprises a strobe light triggered by the position sensor.

20. The digital film scanner of claim 19, wherein the strobe light and the digital imaging device are synchronized and are triggered by the position sensor.

21. The digital film scanner of claim 20, wherein the digital imaging device is a charge-coupled device video camera.

22. The digital film scanner of claim 12, wherein the fixed edge guide of the film gate assembly further comprises sapphire wear plates.

* * * * *